INVENTORS
ROLAND D. DeLAMAR
ROBERT H. HEROD
BY
Beehler & Arant
ATTORNEYS
ALLEN A. DICKE, JR., AGENT

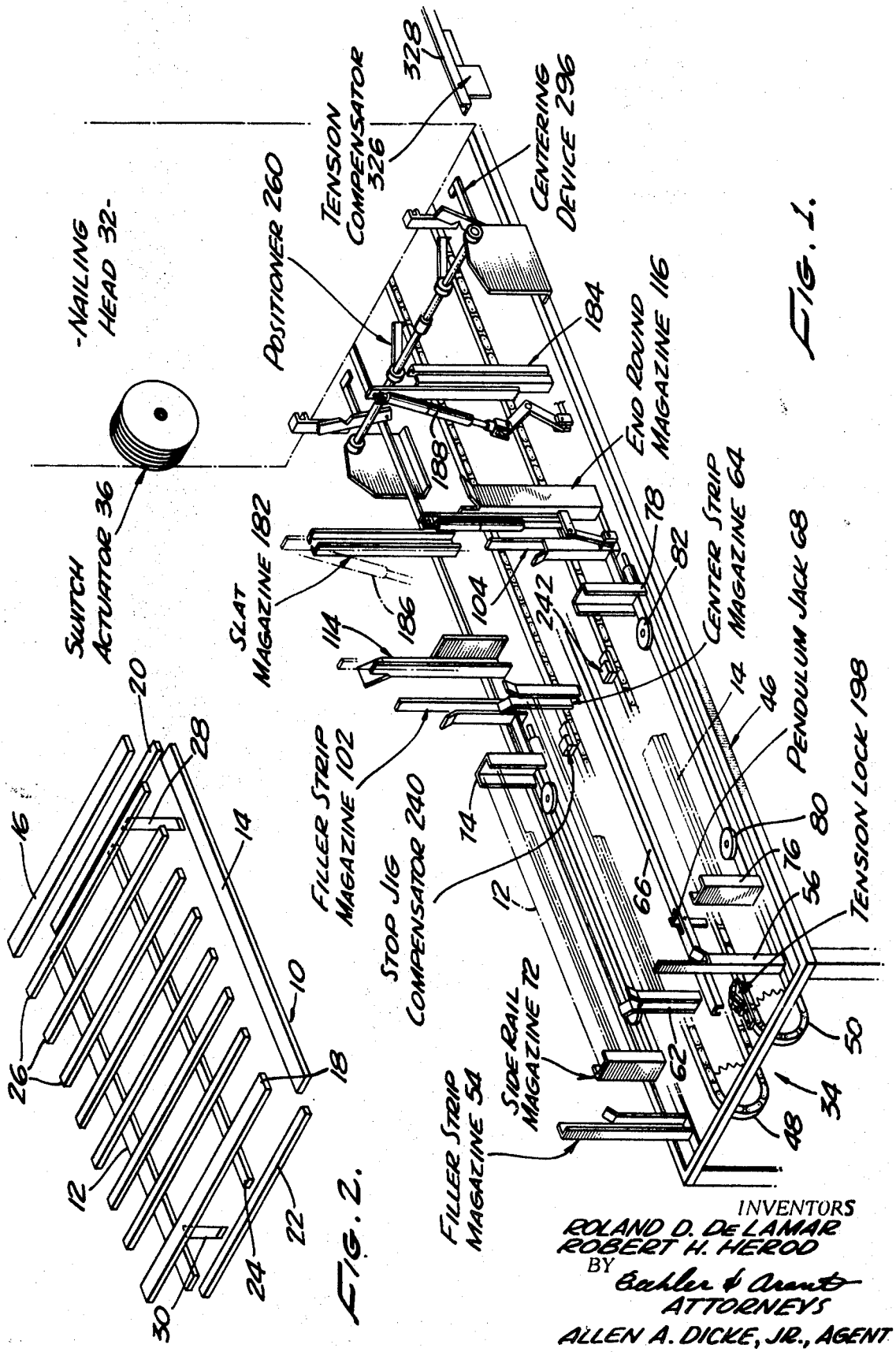

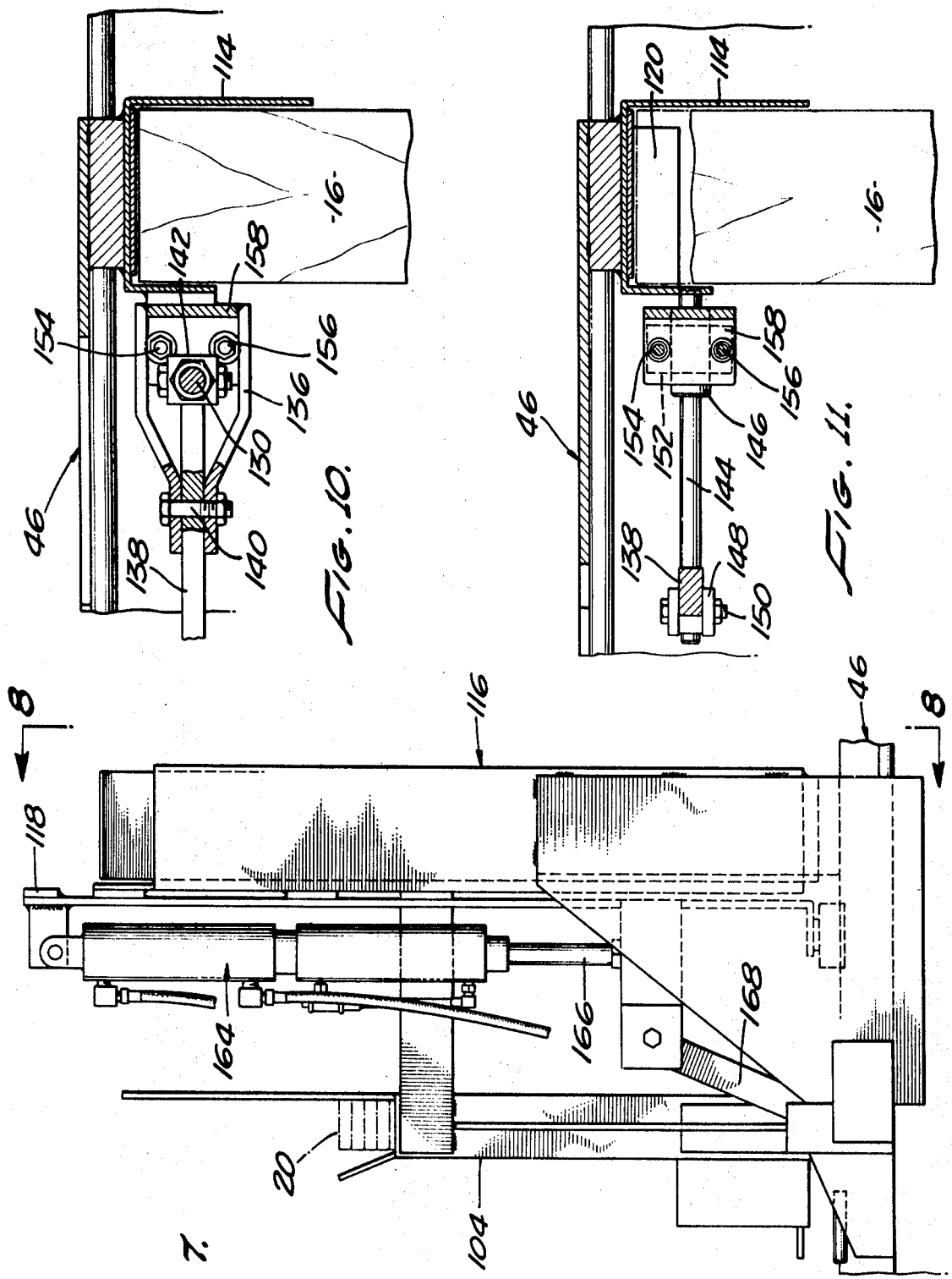

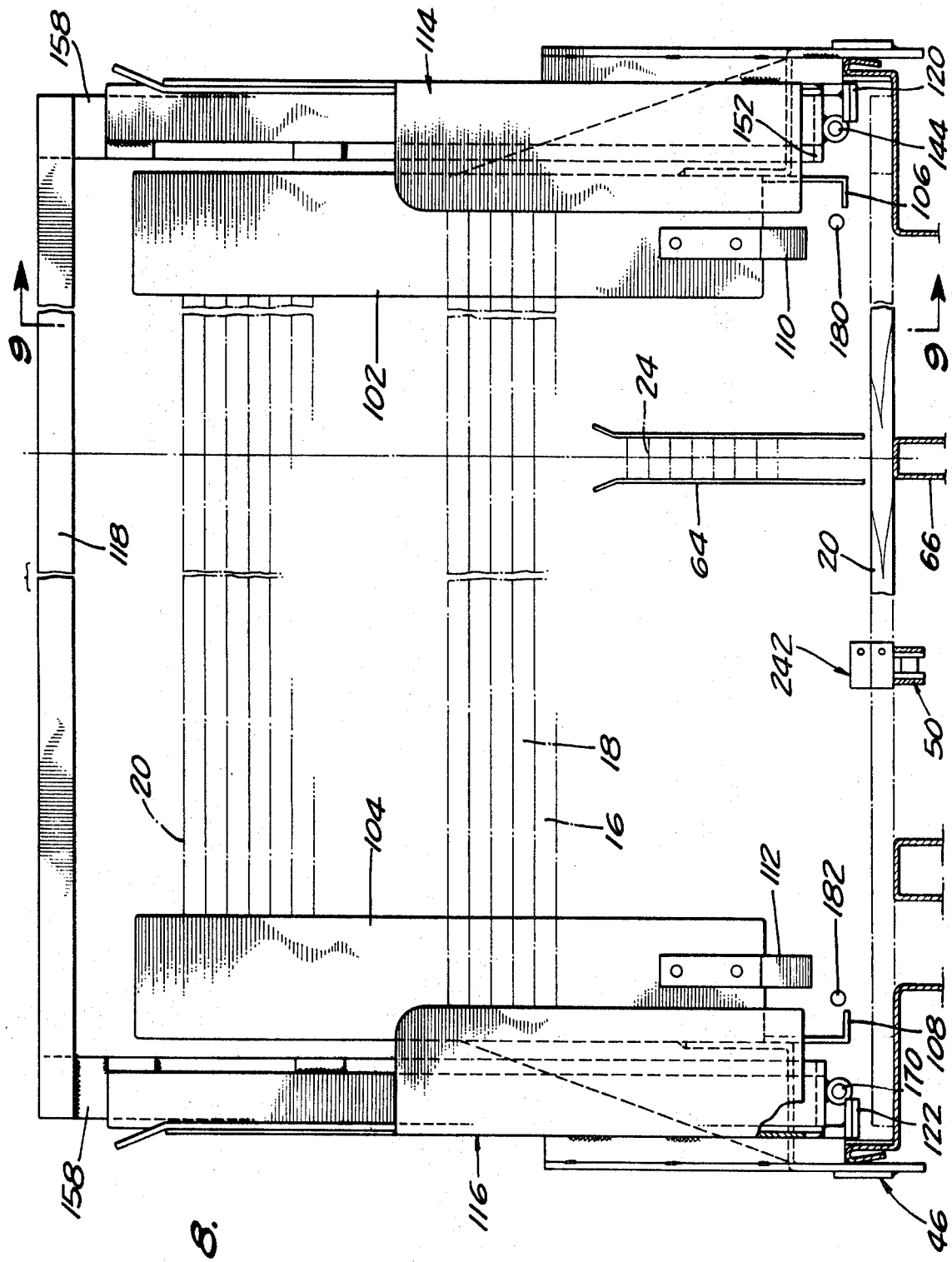

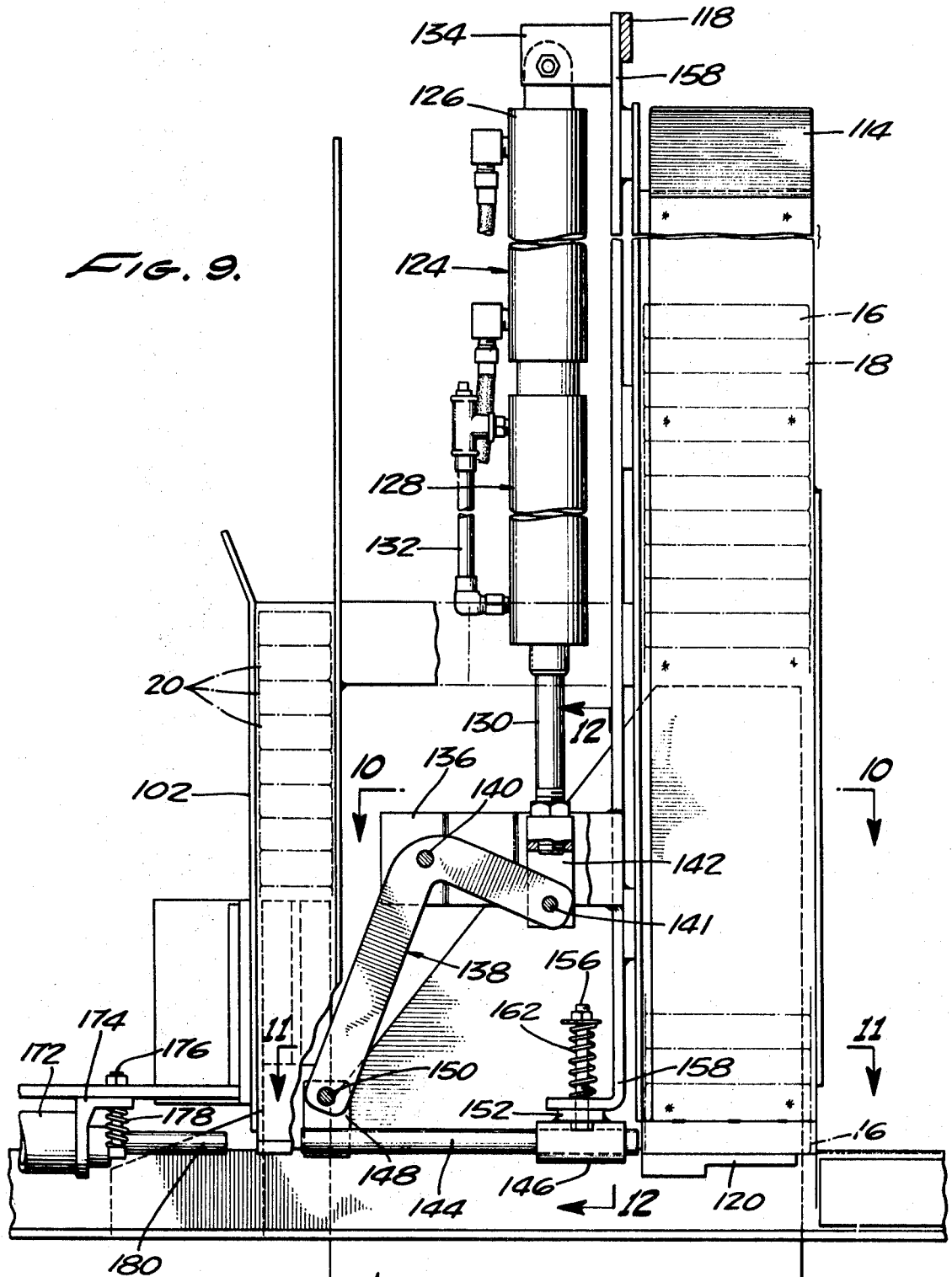

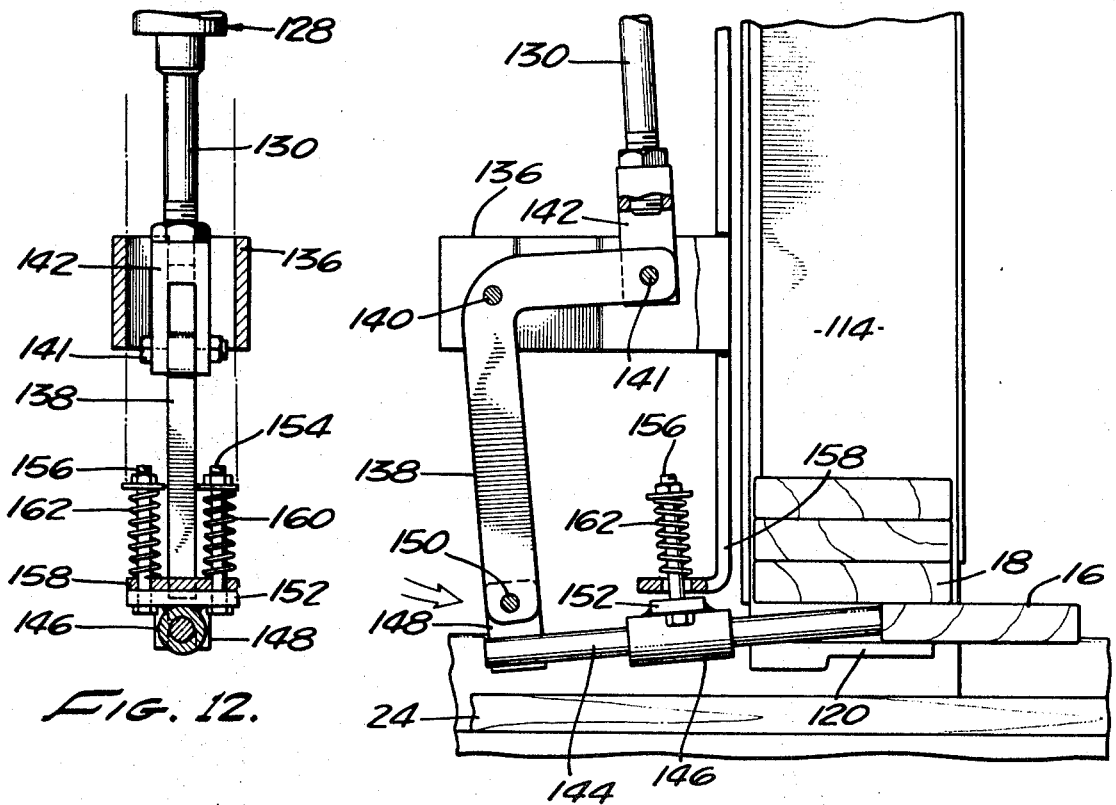
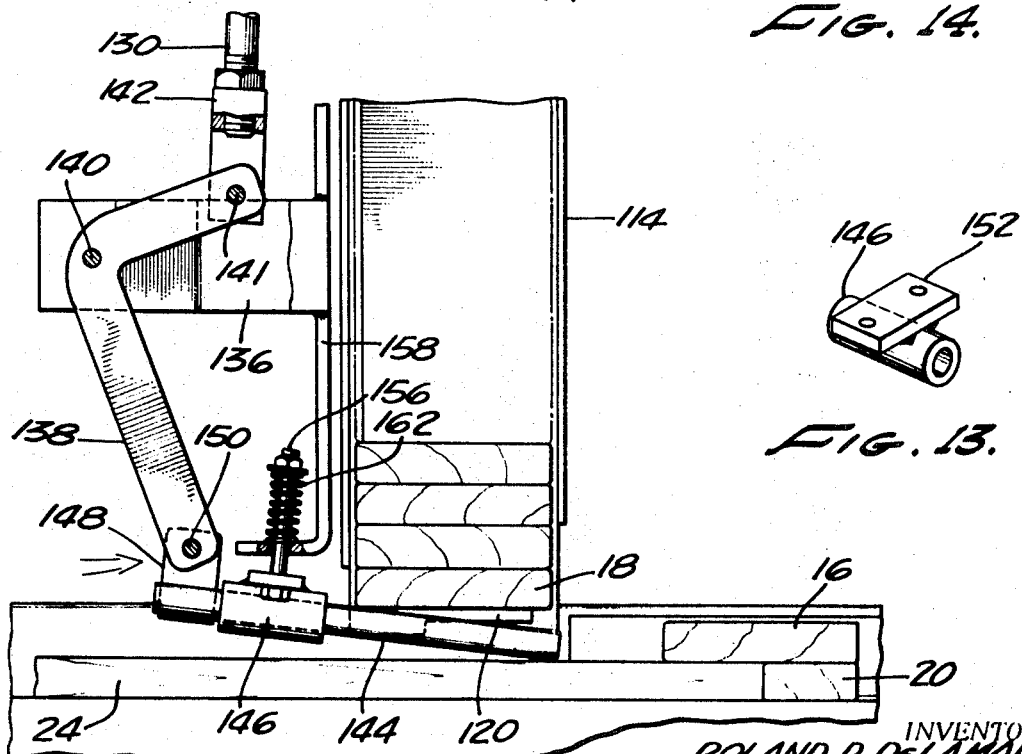

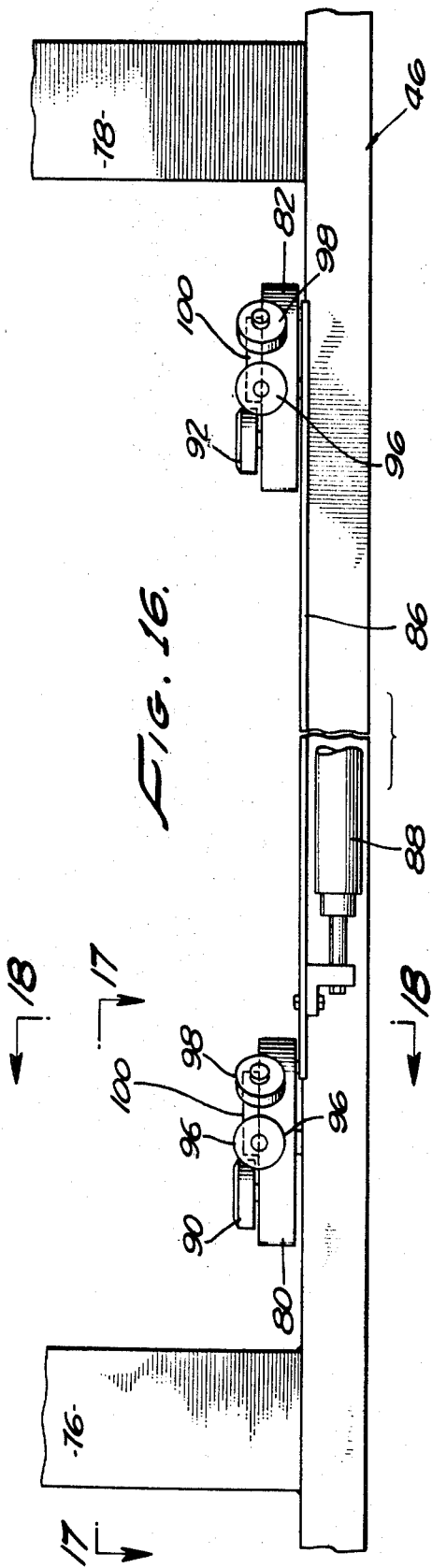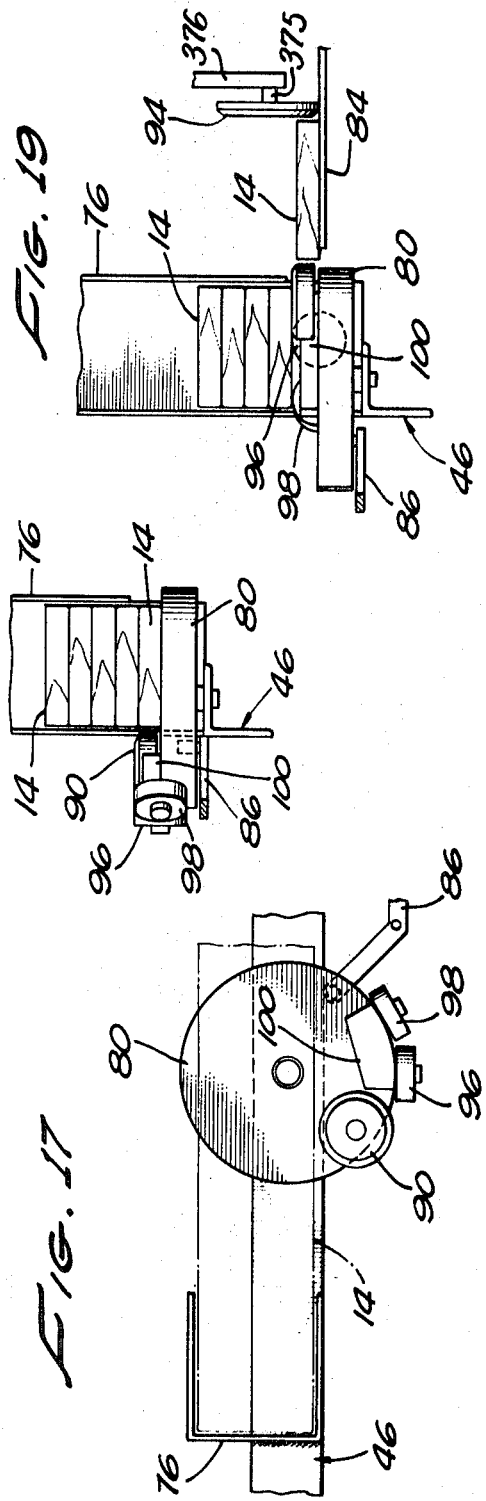

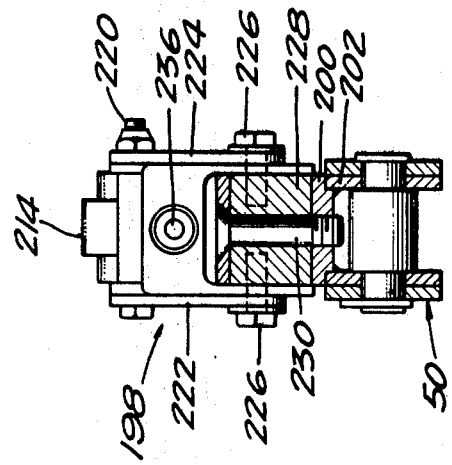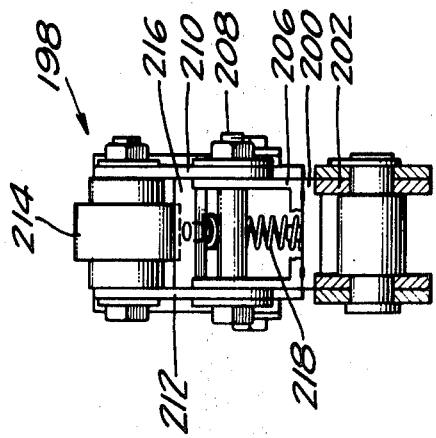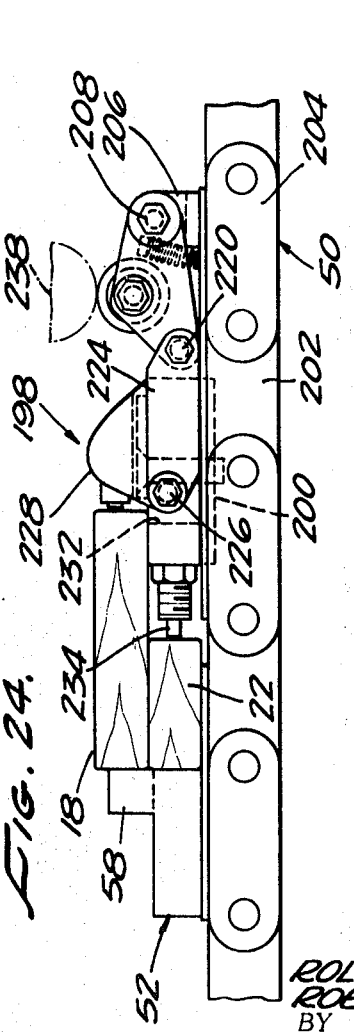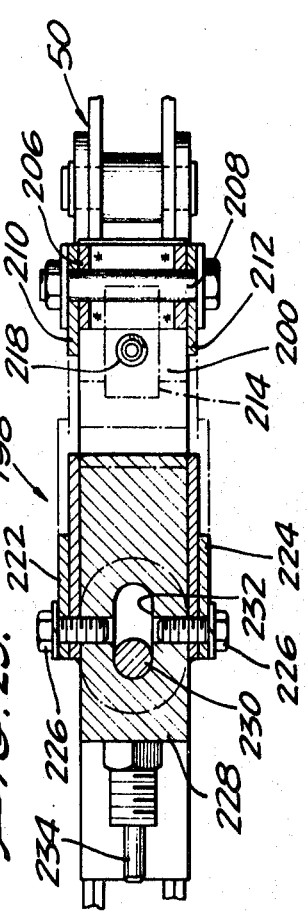

Sept. 20, 1971 R. D. DE LAMAR ET AL 3,606,130
CONVEYOR CONTROLS FOR NAILING MACHINE
Filed March 20, 1969 19 Sheets-Sheet 9

INVENTORS
ROLAND D. DeLAMAR
ROBERT H. HEROD
BY
Beehler & Arant
ATTORNEYS
ALLEN A. DICKE, JR., AGENT

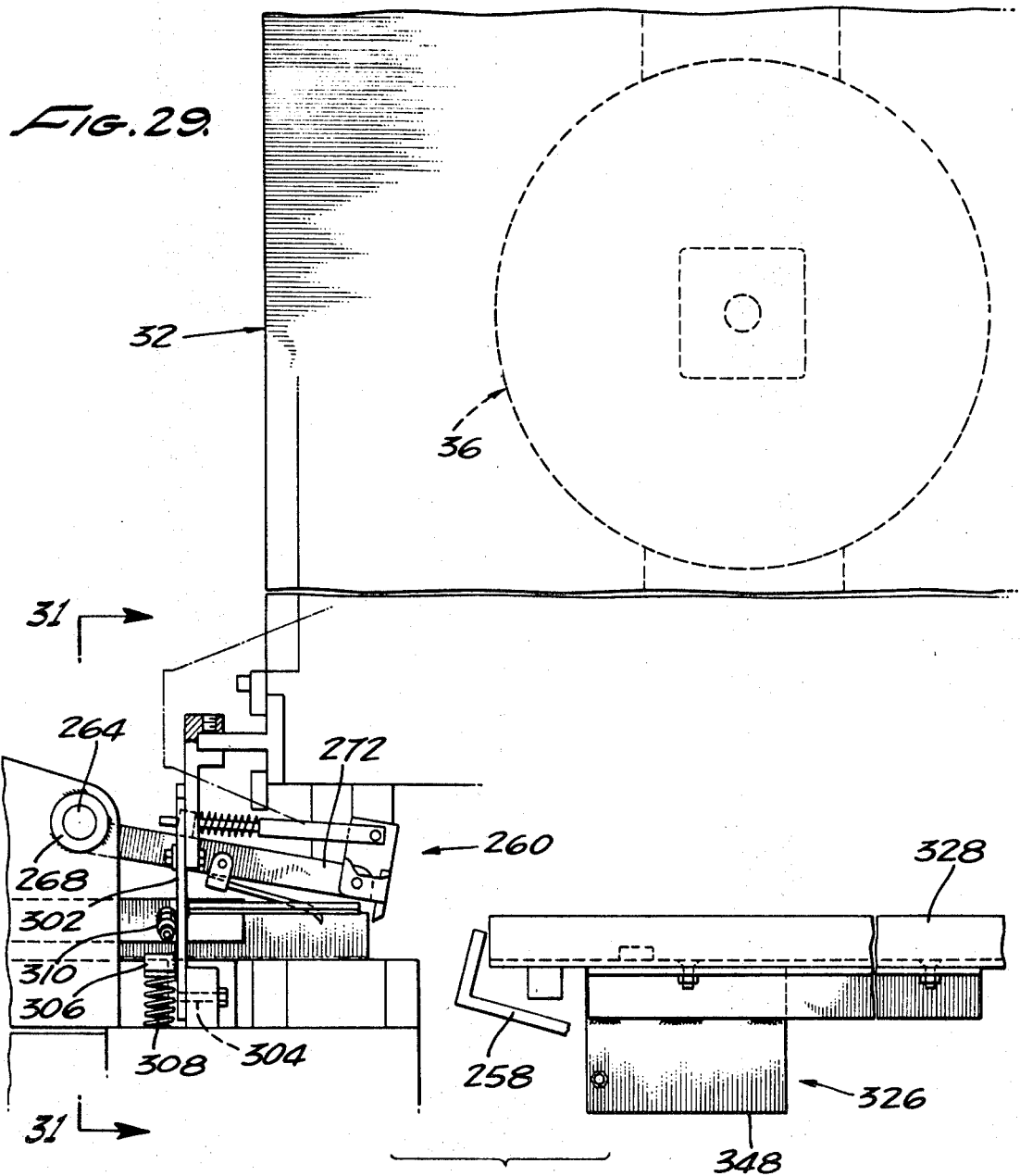

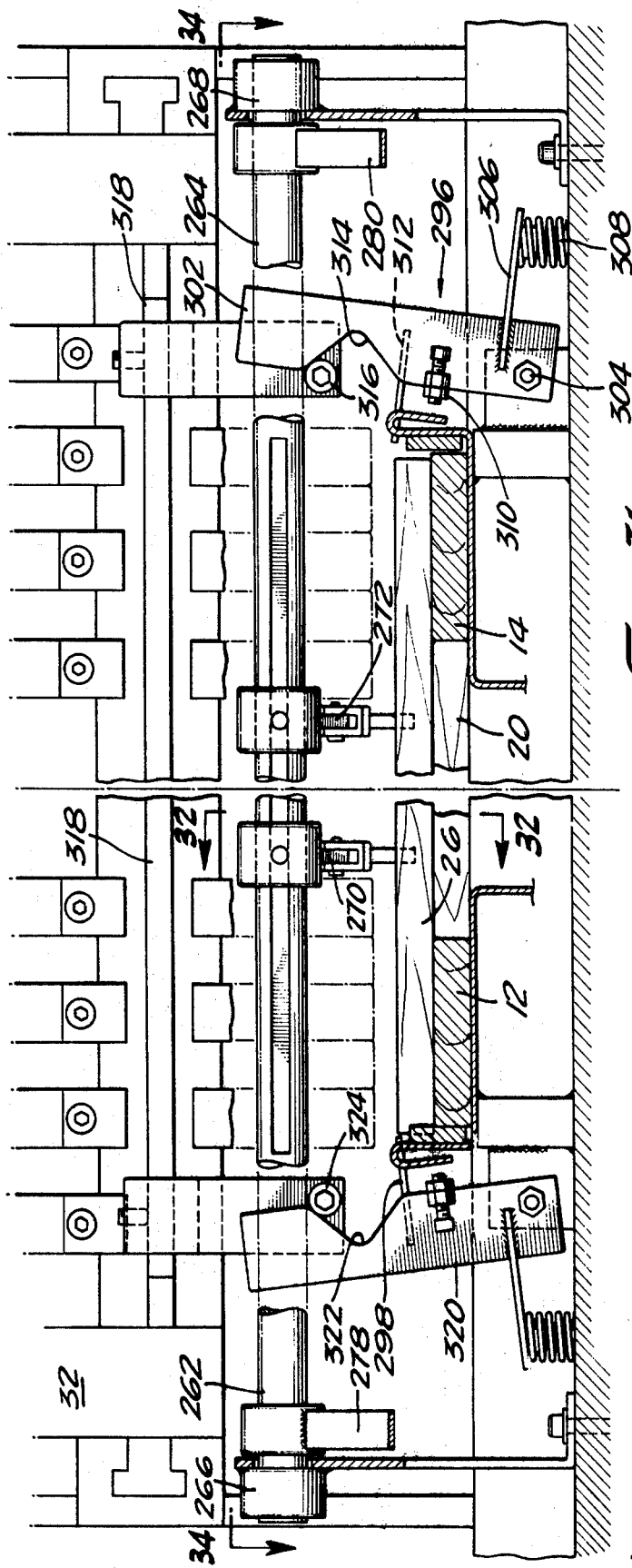
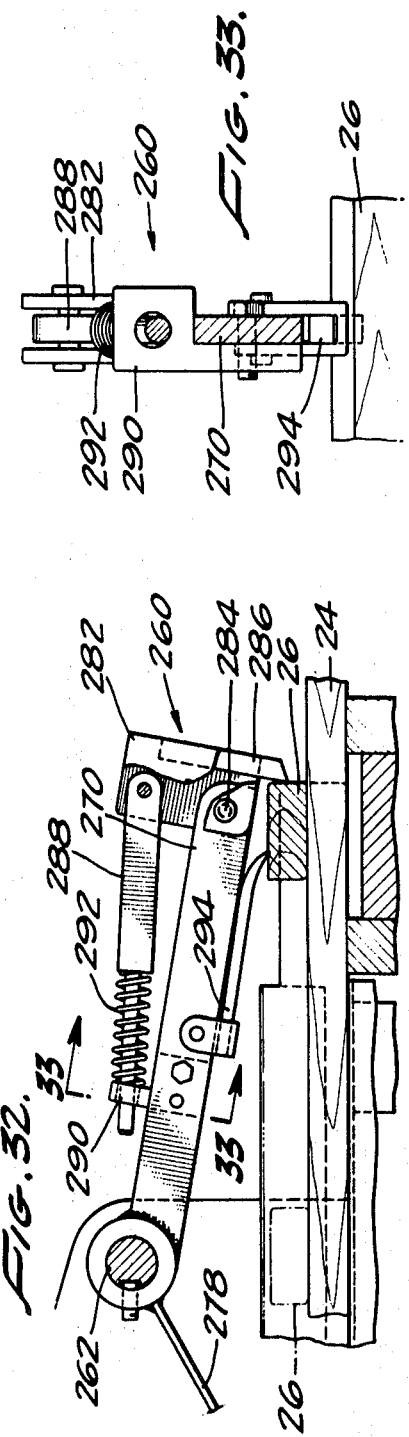

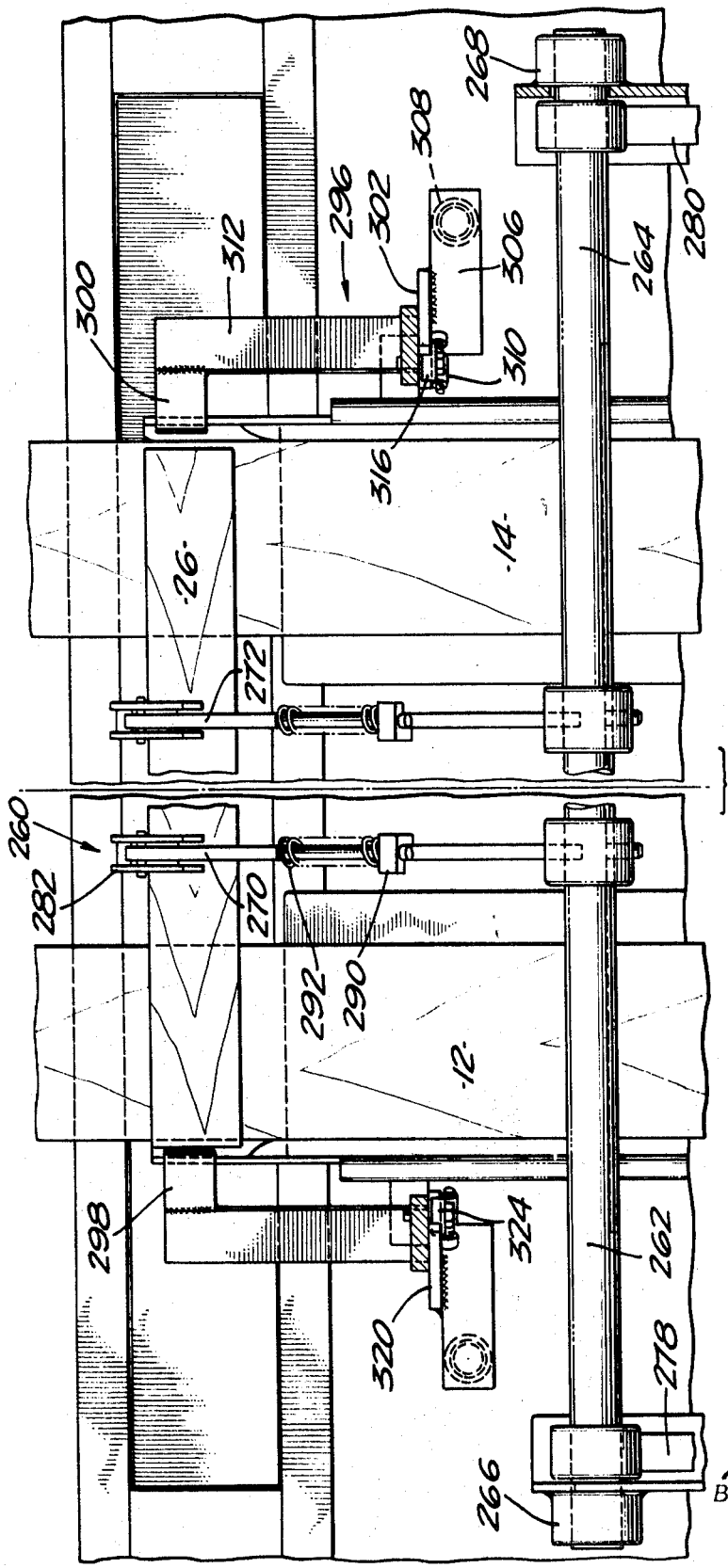
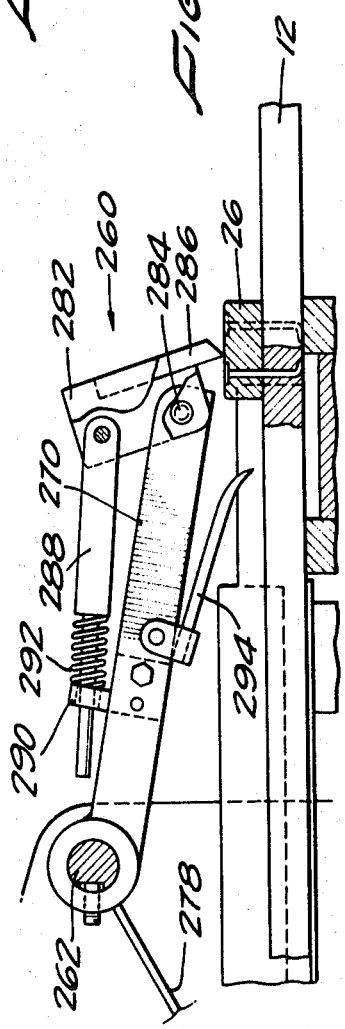

INVENTORS
ROLAND D. DELAMAR
ROBERT H. HEROD
BY
Beehler & Arant
ATTORNEYS
ALLEN A. DICKE, JR., AGENT

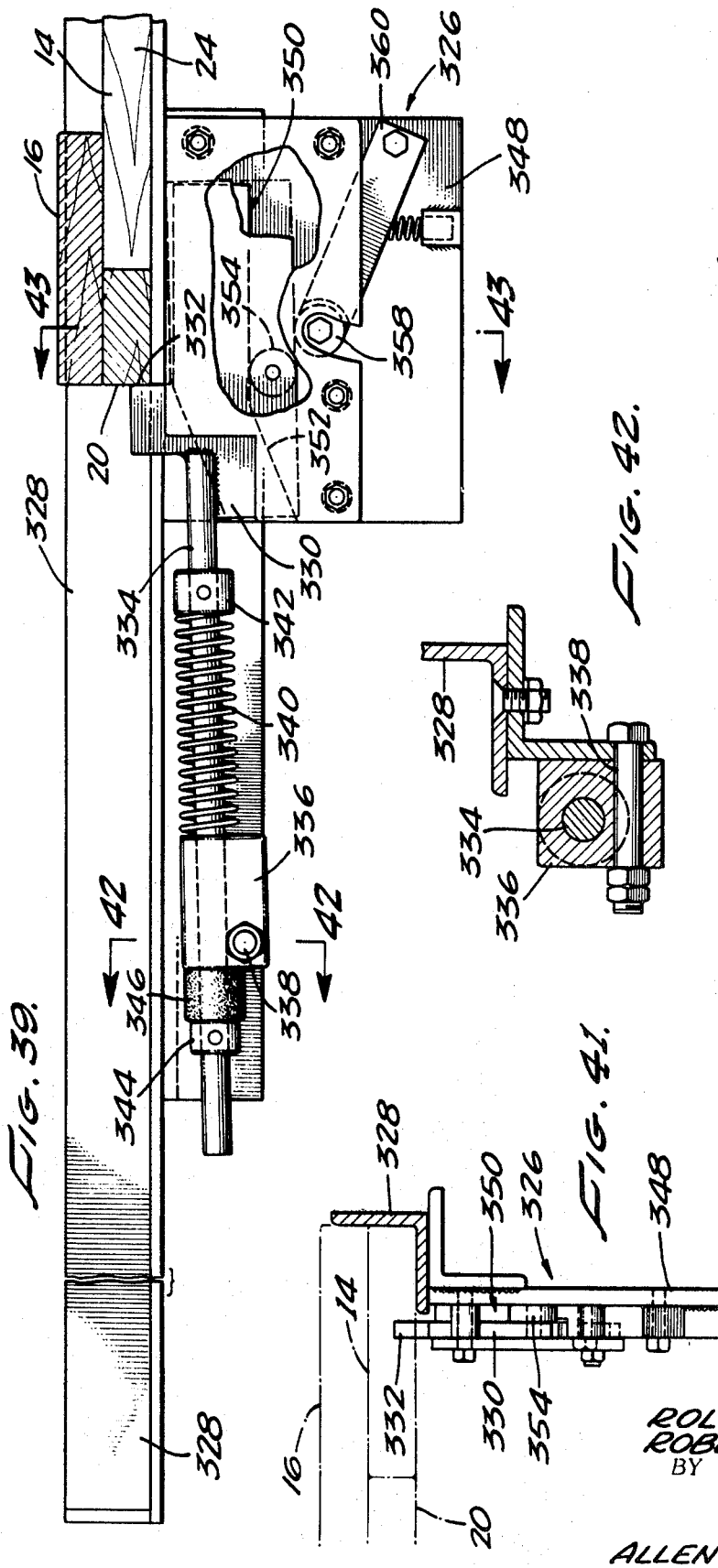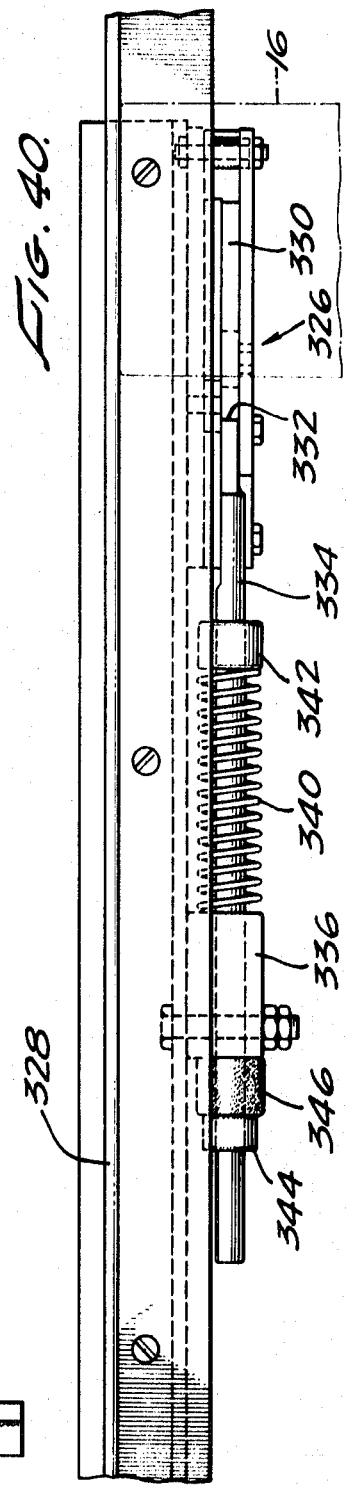

INVENTORS
ROLAND D. DeLAMAR
ROBERT H. HEROD
BY Beehler & Arants
ATTORNEYS
ALLEN A. DICKE, JR., AGENT

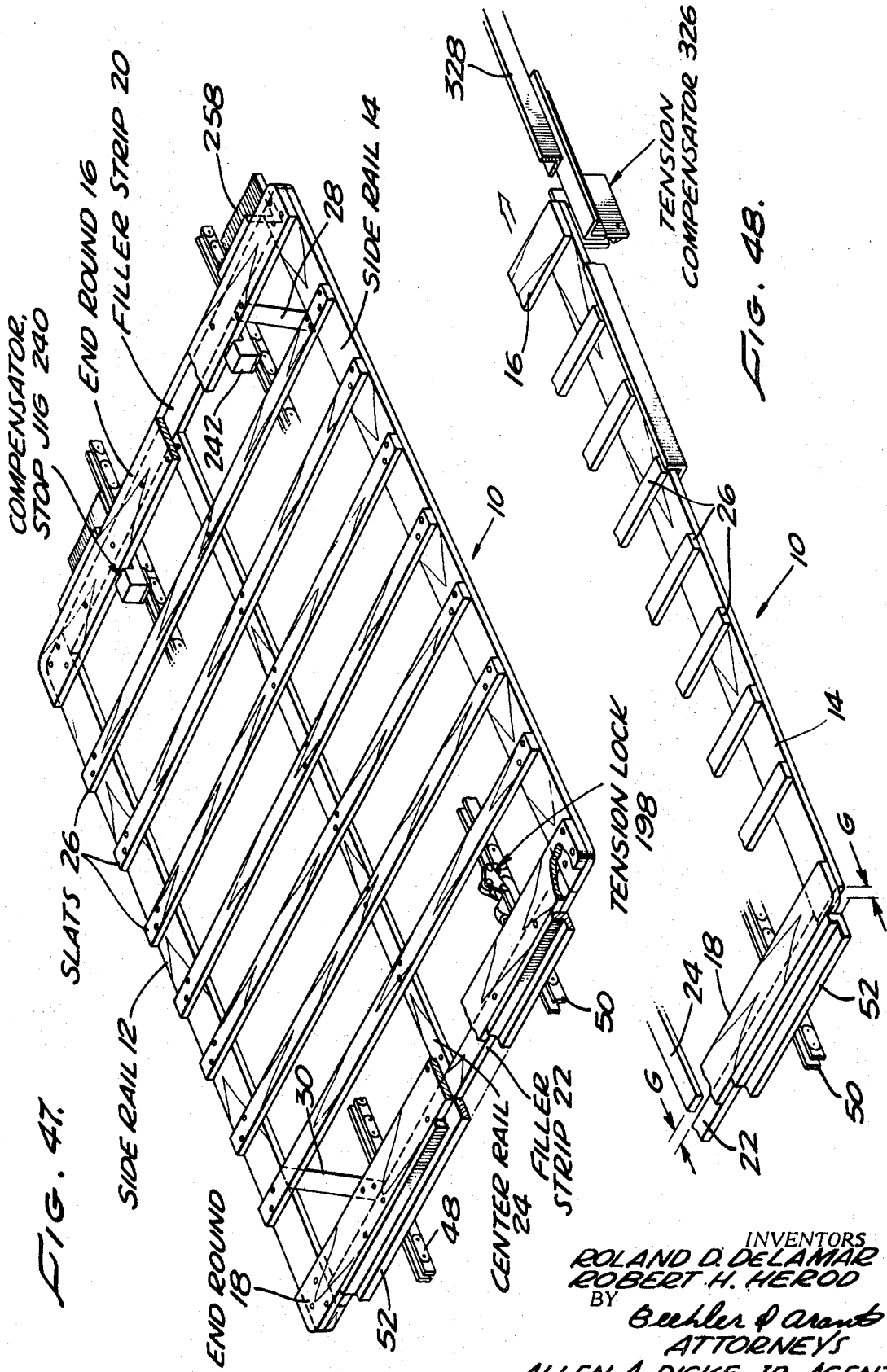

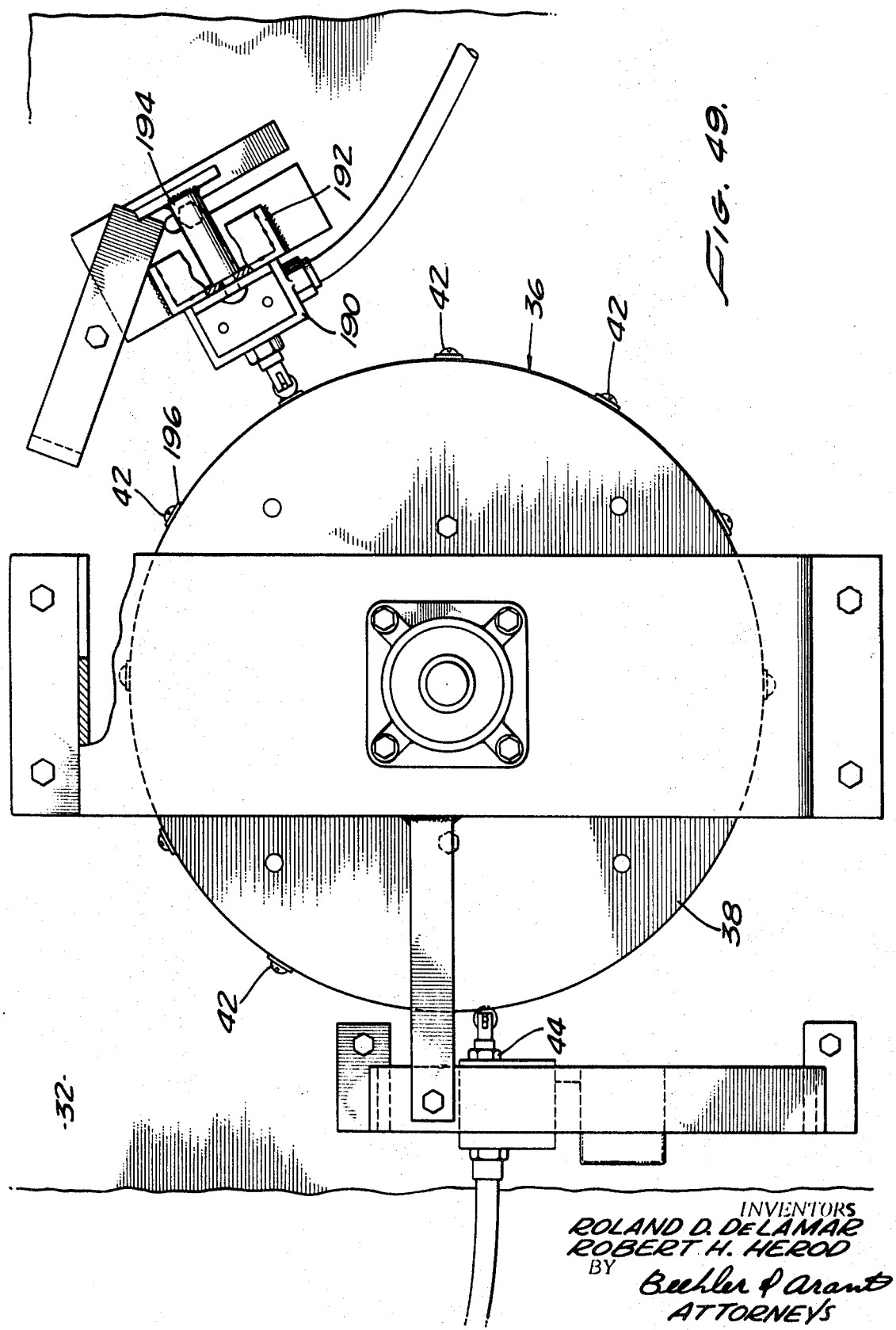

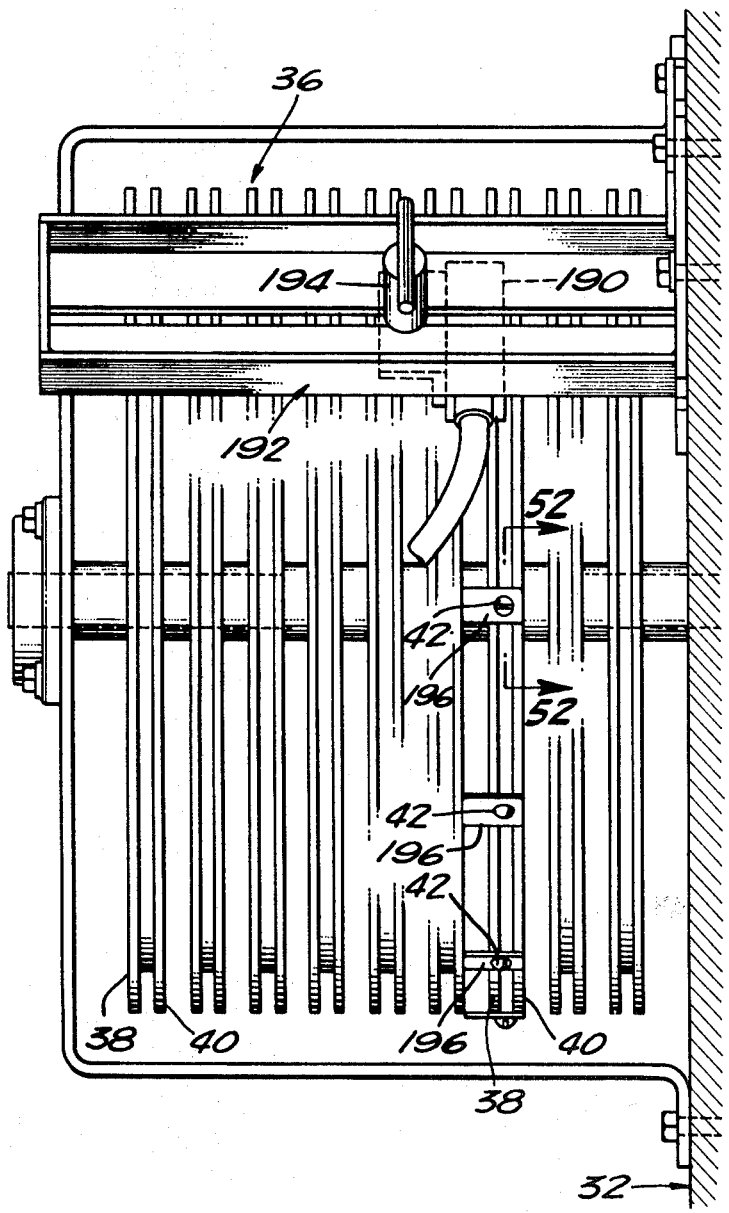
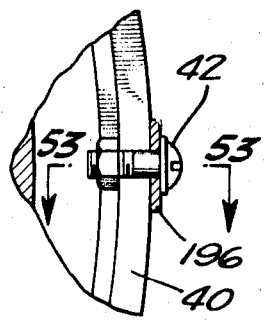
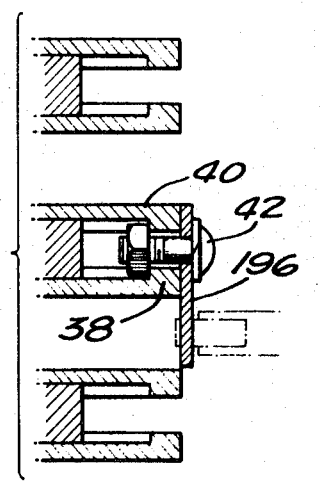
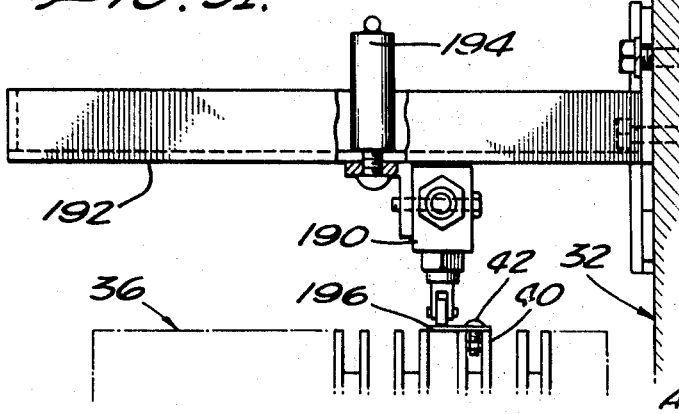

3,606,130
CONVEYOR CONTROLS FOR NAILING MACHINE

Roland D. De Lamar, Newport Beach, and Robert H. Herod, Escondido, Calif., assignors to De Lamar Bed Spring Corporation, Los Angeles, Calif.
Filed Mar. 20, 1969, Ser. No. 808,910
Int. Cl. B27f 7/02
U.S. Cl. 227—45            26 Claims

ABSTRACT OF THE DISCLOSURE

The bed frame nailing machine comprises a conveyor in association with a nailing machine. Wooden bed frame members are for the most part automatically discharged onto and positioned upon the conveyor. They are locked together in unitary structure as the nailing machine accomplishes securement. Some of the bed frame parts are discharged onto the conveyor and locked on the conveyor in accordance with signals from conveyor position. Others are discharged in accordance with nailing machine programming. Magazines are provided for the various parts and discharge from the magazines onto the conveyor is accomplished by several novel structures.

At least one of the magazines has a pusher which pushes the bottom frame member out of the magazine onto the conveyor, with the pusher being spring mounted so that the magazine load can descend and resiliently move the pusher out of the way to prevent pusher jamming upon the return stroke. Another magazine employs a pusher which cannot be depressed in the direction of magazine load, but the pusher carries rollers thereon which carry the magazine load while the pusher is in the actuated position.

In addition to the locks which secure the main bed frame members on the conveyor while the bed frame is being moved to the nailing position, slat positioners engage the individual slats and position them with respect to the bed frame in accordance with desired position as signaled by the nailing machine program. Furthermore, the slats are positioned transversely of the bed frame as the nailing heads descend.

BACKGROUND OF THE INVENTION

This invention is directed to a bed frame nailing machine, and particularly to the conveyor structure employed in association with an automatic nailing head together with automatic feed means for feeding parts onto the conveyor, automatic clamping and positioning structure for clamping and positioning major parts of the wooden bed frame upon the conveyor as it is fed to the automatic nailing head and automatic feeding and positioning structure actuated by the programming of the automatic nailing head for feeding and positioning additional parts of the wooden bed frame so that the wooden bed frame is assembled, positioned and nailed.

Automatic nailing machines are known in the art. Presently known nailing machines include nailing machines which have a plurality of nailing stations, any group of which can be selected by program to drive nails where required. The program is drum actuated so that different groups of nails can be employed at different positions along the length of the structure being nailed.

The FMC Corporation, particularly at its Riverside division in Riverside, Calif., produces industrial nailers. FMC industrial nailer type 423000, when equipped with their electric nail selector type 12CY Model 423079, is particularly useful for the nailing of bed frames, and to serve as part of the combination of the bed spring nailing machine of this invention.

The nailing machine identified above is not totally disclosed in any one patent. G. E. Stilwell et al. Pat. No. 2,456,221 granted Dec. 14, 1968 discloses a nailing machine structure somewhat similar to the industrial nailer identified above, at least as far as the overhead nailing structure is concerned. Furthermore, it illustrates that conveyors can be employed with nailing machines to permit the delivery to the nailing head of an assembled structure ready for nailing.

Additionally, G. E. Stilwell Pat. No. 2,511,020 granted June 13, 1950 shows in more detail the nail driving structure very similar to the above identified industrial nailer. It illustrates that the plurality of nailing heads is adjustable so that a particular nailing position can be adjusted. However, Pat. No. 2,511,020 illustrates a machine wherein the nailing heads are positioned generally axially of material motion through the nailing machine and are adjustable in that direction, as contrasted to the industrial nailer identified above wherein the individual nailing heads are positioned across and adjustable across the path of motion of the members to be nailed. J. R. Richards Pat. No. 2,686,911 granted Aug. 24, 1954 illustrates a nailing machine wherein the nailing heads are positioned across the direction of material travel through the nailing machine, and further illustrates a clincher mechanism similar to the type employed in the industrial nailer identified above. Each of the above patents teaches something of the industrial nailer identified above, and above identified patents are incorporated herein in the entirety by this reference. However, the nailing machines of the above identified patents do not fully teach the industrial nailer which forms a part of the combination bed frame nailing machine of this invention. The industrial nailer includes controls in each nail feed to selectively permit nails to be fed. When it is desired that a particular nail chuck hold the nail so that upon the nailing stroke a nail is driven by that nail chuck, a solenoid controlled nail pick is actuated in that particular nail feed. Thus, by controlling the solenoids in the nail feed, which of the nail chucks will hold nails and thus participate in the nailing action can be selected.

A selector panel is connected to the solenoid controlled nail picks, and a switch actuator drum is connected to the feed conveyor. The switch actuator drum is in turn connected to the nail selector panel so that when a particular conveyor position is indicated by the switch actuator drum, a particular line of switches is indicated on the selector panel. Placement of the switches in such switch line thus selects which of the solenoids is to be actuated to determine which nail feeds will feed nails on that particular cycle. By this means, different nail patterns can be selected at different conveyor positions, limited only by the number of positions on the switch actuator drum and the number of lines on the nail selector panel. This is the electric nail selector type 12CY Model 423079 mentioned above with respect to the industrial nailer.

The several patents identified above include some magazine feeds for feeding members onto a conveyor or into a position to be nailed. Such magazines sometimes use conveyor feed to draw members out of the magazine. However, when the members to be nailed are wooden boards, often they are rough, uneven or even sometimes have areas of rosin or sap. Thus, it is difficult to slide the bottom member out of the magazine, especially when there is a fairly tall load of members in the magazine weighted down upon the bottom member. Thus, a considerable amount of conveyor power is necessary, simply to withdraw members from the magazine. Furthermore, prior bed spring conveyors to such nailing machines have not employed proper or automatic discharge of the various members together with proper positioning of them upon the conveyor. Thus, much handwork is necessary in present machines to position the members. Accordingly, positioning errors occur, which result in a high reject rate. Additionally, no integrated system has been available wherein the nailing machine, by its cycle control, controls the discharge of members so that their positioning is in accordance with the nailing machine cycle.

SUMMARY

In order to aid in the understanding of this invention it can be stated in essentially summary form that it is directed to a frame nailing machine. The frame nailing machine includes a conveyor and a nailing head which cooperate together to assemble the plurality of frame members on the conveyor in proper position so that they can be nailed together with a minimum of handwork, with accuracy and with a maximum of efficiency. The frame nailing machine includes a control device which is responsive to conveyor position to place members upon the conveyor and to select the proper nail pattern of the nailing head. Additionally and separately, a plurality of member feed devices are provided. Furthermore, and separately, a plurality of member positioning devices are provided for positioning members with respect to each other at the time of nailing.

Accordingly, it is an object of this invention to provide a bed frame nailing machine which employs a conveyor in association with a nailing head together with a control device for the nailing head which is responsive to conveyor position so that the control device controls both nail pattern of the nailing head and actuation of bed frame member feed devices which deliver members onto the conveyor.

It is another and separate object to provide a magazine with feed means therefore wherein the feed means is positioned at the bottom of a substantially vertical magazine to feed the bottom member out of the magazine, with the feed finger resiliently mounted so that it can move out of the way under the load of members in the magazine.

It is another and separate object to provide a magazine for the discharge of bed frame members onto a conveyor wherein a thrust device engages the bottom-most bed frame member in a substantially vertical magazine and thrusts that member onto a conveyor, together with support means on the thrusting device to hold the remaining members in the magazine above the thrusting device.

It is another and separate object to provide a jack under a substantially upright magazine of frame members with the jack positioned so that it holds up the frame members in the magazine after the lowermost member is stripped off by the conveyor, to prevent the conveyor from engaging more than one such member at a time.

It is still another and separate object of this invention to provide a tension lock which locks bed frame members on the conveyor after they have been discharged onto the conveyor.

It is still another and separate object to provide a stop jig compensator which aligns adjacent members during the nailing step so that they are nailed in alignment.

It is yet another and separate object of this invention to provide a bed frame member positioning device which positions a bed frame member laterally and longitudinally of the main part of the bed frame positions and restrains it during nailing.

It is yet another and separate object of this invention to provide a tension compensator which engages a portion of the bed frame being nailed to hold the bed frame in position during the last nailing operation.

It is yet another and separate object of this invention to provide for control of bed frame member feeding and positioning in accordance with conveyor position as the conveyor position is represented by a switch actuator on the nailing machine which in turn controls the position where nails are to be driven.

Other objects and advantages of this invention will become apparent from the study of the following portion of the specification, the claims and the attached drawings.

BRIEF DESCRIPTION OF THE DRAWINGS

FIG. 1 is a schematic perspective view of many of the working parts of the bed frame nailing machine of this invention showing the various working parts in operative inter-relationship.

FIG. 2 is an exploded view of an exemplary bed frame that can be assembled and nailed on the bed frame nailing machine of this invention.

FIG. 7 is a side elevational view of the end round magazine and the filler strip magazine.

FIG. 8 is a front view thereof as seen along the line 8—8 of FIG. 7.

FIG. 9 is an enlarged sectional view taken along the line 9—9 of FIG. 8.

FIG. 10 is a horizontal sectional view taken generally along the line 10—10 of FIG. 9.

FIG. 11 is a further horizontal sectional view taken at a lower elevation, along the line 11—11 of FIG. 9.

FIG. 12 is a partial sectional view taken along the line 12—12 of FIG. 9.

FIG. 13 is an isometric view of the push rod support bearing which supports the push rod at the bottom of the end round magazine.

FIG. 14 is a partial section showing a portion of the structure seen in FIG. 9 with the push rod part way through its feed stroke.

FIG. 15 is a view similar to FIG. 14 showing the push rod at the end of its feed stroke.

FIG. 16 is a side elevational view, with parts broken away, showing one of the side rail magazines together with the side rail feed structure.

FIG. 17 is a plan view thereof seen generally along the line 17—17 of FIG. 16.

FIG. 18 is an elevational section taken along the line 18—18 of FIG. 16 showing the feed structure position ready to feed a side rail.

FIG. 19 is a view similar to FIG. 18 showing the feed structure just after it has fed a side rail.

FIG. 20 is a side elevational view of the tension lock employed in restraining some of the bed members on the conveyor, showing the tension lock in the disengaged position.

FIG. 21 is a section taken generally along the line 21—21 of FIG. 20.

FIG. 22 is a section taken genrally along the line 22—22 of FIG. 20.

FIG. 23 is a section taken generally along the line 23—23 of FIG. 20.

FIG. 24 is a side elevational view, similar to FIG. 20, showing the tension lock in the engaged, holding position.

FIG. 29 is a side elevational view, with parts broken away, showing the slat positioner for the positioning of slats on the bed frame and restraining the slats during nailing.

FIG. 30 is a partial section of a portion of the slat positioner interconnecting shaft.

FIG. 31 is an enlarged sectional view of the slat positioner and centering device taken generally along the line 31—31 of FIG. 29.

FIG. 32 is a section taken generally along the line 32—32 of FIG. 31.

FIG. 33 is a section taken generally along the line 33—33 of FIG. 32.

FIG. 34 is a plan view of the slat positioner and slat centering device as seen generally along the line 34—34 of FIG. 31.

FIG. 38 is a view similar to FIG. 32 but showing the release of the slat positioner as the nailed slat is moved out of engagement with the positioner as the bed frame is moved forward.

FIG. 39 is a side elevational view, with parts broken away, of the tension compensator which engages the front end of the bed frame to restrain the bed frame while the rear end of the bed frame is being nailed.

FIG. 40 is a plan view thereof.

FIG. 41 is a front end elevational view thereof.

FIG. 42 is a section taken generally along the line 42—42 of FIG. 39.

FIG. 47 is an isometric view of the bed frame assembled on the conveyor.

FIG. 48 is a view of the assembled bed frame, with parts broken away, showing the bed frame approaching engagement with the tension compensator for the last nailing on the bed frame.

FIG. 49 is an end elevational view of the switch actuator drum showing the position of switches actuated thereby.

FIG. 50 is a side elevational view thereof.

FIG. 51 is an elevational view showing the mounting of switches actuated by the switch actuating drum.

FIG. 52 is an enlarged section taken generally along the line 52—52 of FIG. 50.

FIG. 53 is a section taken generally along the line 53—53 of FIG. 52.

DESCRIPTION

Figure 3:
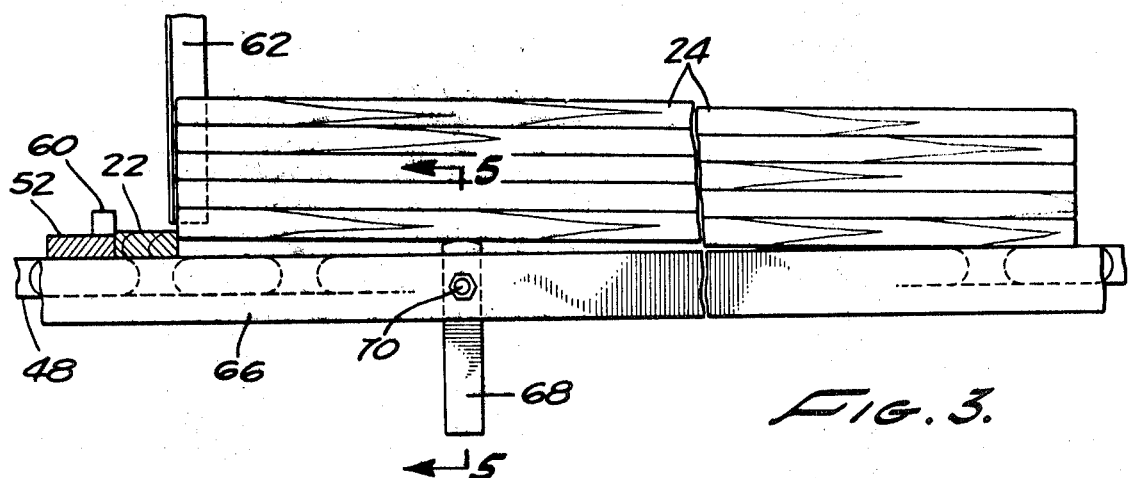
FIG. 3 is a side elevational view of part of the conveyor showing the initial position of the pendulum jack employed with one of the member magazines in the bed frame nailing machine of this invention.

Referring particularly to FIGS. 2, 47 and 48, an exemplary bed frame 10 is shown therein. The bed frame 10 comprises side rails 12 and 14 which extend from end to end of the bed frame. Positioned on top of the side rails, with one at each end are end rounds 16 and 18. There is no difference between the ends of the bed frame 10, but in view of the fact that the bed frame moves through the nailing machine in the left to right direction as is seen in these figures, end round 16 is on the front end while the end round 18 is at the rear end. Positioned between side rails 12 and 14, and respectively beneath end rounds 16 and 18 are filler strips 20 and 22. The filler strips fill the space between the side rails at the ends below the end rounds so that the lower outer periphery of the bed frame is coplanar. Center rail 24 is employed on the wider bed frame structures, but it is not necessary in narrower sizes. A plurality of slats lie transversely across the side rails so that their upper surfaces are even with the upper surfaces of the end rounds. The slats are indicated at 26. The number of slats employed depends upon the overall length of the bed frame. Finally, braces 28 and 30 are positioned at diagonally opposite corners of the bed frame. Only two are required, and the diagonally opposite corner positions provide the best rigidity. Corner braces 28 and 30 lie against the end filler strips and under the end rounds. On the opposite ends they lie against the side rails and under one of the slats. Thus, nailing through the end rounds and slats secures the corner braces in position.

Referring to FIG. 1, the nailing machine comprises a nailing head 32, a conveyor generally indicated at 34 and a plurality of bed frame member feeding and positioning devices, which are described in detail below. The nailing head is of the nature previously described, and incorporates nailing control means so that different nail positions can be selected upon successive nailing strokes. Conveyor 34 is power driven, and switch actuator 36 is directly connected to the conveyor so that it rotates with conveyor motion. The conveyor has five stations thereon, each having a pusher 52, a pair of tensioners 198, and a pair of tension stops 240, 242 associated therewith so as to permit the assembly of a bed frame at each station. Since the conveyor is in the form of an endless loop, two stations are available on the active top surface at any one time. Thus, while one bed frame is fully assembled and being nailed, another bed frame is being assembled. Thus, switch actuator 36 makes five rotations for each complete revolution of the conveyor. Thus, one rotation of the switch actuator 36 corresponds to the movement of one station of the conveyor along its length.

Referring to FIGS. 49 through 53, switch actuator 36 is shown as comprising a plurality of pairs of discs. Two discs of such a pair are shown at 38 and 40. The discs have facing undercuts to form a T-slot in which screws 42 can be secured, as is illustrated particularly in FIGS. 49, 52, and 53. These screws can be positioned anywhere around the circumference of the disc pair and are positioned to actuate a switch corresponding to each disc pair. Such a switch is illustrated at 44.

Switch 44 is connected to the conveyor drive and to the nailing head actuating structure so that upon actuation of switch 44 the conveyor is stopped, the particular nail chucks to receive nails are selected and nails are delivered thereto, in the manner described above in the background section, and the nailing head is actuated to drive those nails. Upon completion of the driving, the nailing head signals such completion to the circuitry and the conveyor is again started to run until switch 44 indicates the conveyor and the bed frame carried thereon is in a new position for nailing. As previously described, the nail selector panel causes nails to be driven only in appropriate places at this new position. Despite the fact there are a plurality of disc pairs 38 and 40, there is only a single switch 44. Only one pair of discs is employed for a setup of the nailing machine for producing a particular bed frame. The additional disc pairs are for arranging the positions of screws 42 for other setups. In this way, a plurality of setups can be maintained and the particular setup being employed for a bed frame is brought into operation by positioning the switch 44 to be actuated thereby. Accordingly switch 44 is appropriaely mounted for positioning to be actuated by the stop screws 42 on any one of the disc pairs.

Figure 4:
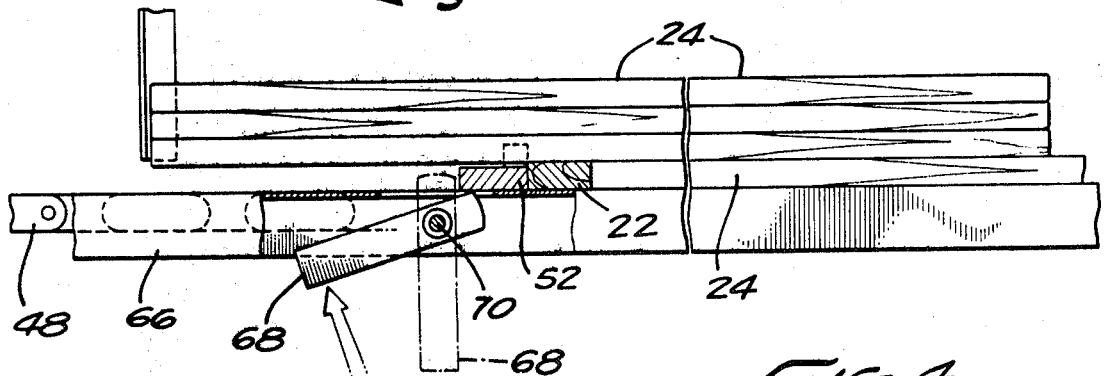
FIG. 4 is a similar view, with parts broken away, showing the pendulum jack in a later position.
Figure 5:
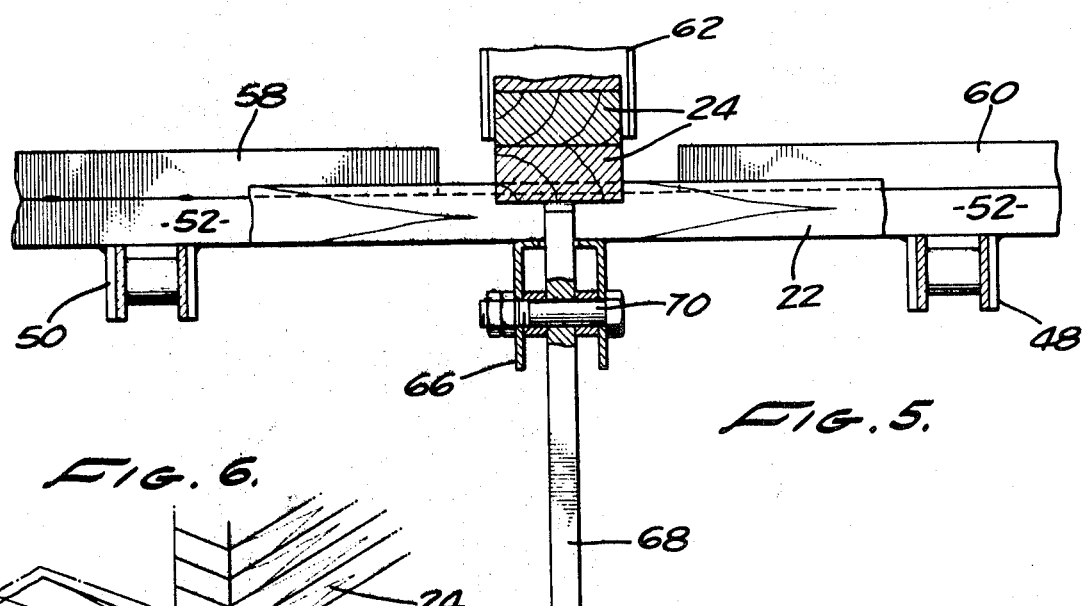
FIG. 5 is an enlarged section taken generally along the line 5—5 of FIG. 3.

The bed frame nailing machine includes frame 66 upon which conveyor 34 is carried. Frame 46 has a suitable table top upon which various of the bed frame members can slide and in which there are openings through which the top flights of conveyor 34 extend. This structure forms table top halves which preferably carry the various magazines, so that upon width adjustment of the table top for various bed frame widths, the magazines are appropriately laterally positioned of the direction of conveyor movement. Conveyor 34 comprises chains 48 and 50 which are suitably supported throughout their horizontal upper flight. As is seen in FIG. 3 through 5, chains 48 carry pusher 52.

REAR FILLER STRIP MAGAZINE

As is seen in FIG. 1, the rear filler strip magazine comprises first and second filler strip magazine guides 54 and 56. These are channels with their open sides facing each other so that a plurality of filler strips 22 can be placed therein. The guides 54 and 56 have a conventional bottom stop therein to prevent the bottom filler strip in the magazine from resting directly upon chains 48 and 50. However, the side of each of these guides facing in the direction of conveyor motion is open slightly more than the height of one filler strip. Thus, when pusher extensions 58 and 60 secured on the top of pusher 52 engage with the lowermost rear filler strip in the rear filler strip magazine, so that the lowermost filler strip is pushed out of the magazine and falls upon the conveyor against pusher 52 in the position shown in FIG. 3. Thus, filler strip 22 is moved down the conveyor toward the nailing head 32 as the conveyor is moved.

CENTER STRIP MAGAZINE AND PENDULUM JACK

The center strip magazine for carrying a plurality of center strips 24 and dispensing one center strip for each bed frame comprises center strip magazine guides 62 and 64, see FIGS. 1, 3 and 4. As is seen in these figures, magazines guides 62 and 64 again comprise channel shaped guides positioned in an upright position and having their open sides facing each other. Magazine guides 62 and 64 have open bottoms, and the bottoms of these guides are spaced above the top plane of the conveyor and table at a sufficient height that the bottom center strip is free of the guides when it lies at the table plane. The aforementioned table includes center guide 66 which is in the form of a channel having downwardly facing flanges. The uppermost portion of the channel, the back of the web, lies in the plane of the remainder of the table and the top of the conveyor chains.

In the absence of any other structure, the lowermost center strip 24 in the center strip magazine would lie directly upon center guide 66. In fact, the forward end of the lowermost center strip 24 does lie upon center guide 66, as is seen in FIG. 3. Pendulum jack 68 is positioned fairly close to center strip magazine guide 62, as is seen in FIG. 1. Pendulum jack 68 is a bar pivoted upon pivot pin 70 which extends through the flanges of center guide 66. An appropriate slot is provided in the web of the center guide so that the upper end of pendulum jack 68 can swing upward to be positioned above the table plane. The length of pendulum jack 68, as compared to the position of its pivot pin 70 is such that the pendulum jack normally takes the upright position of FIG. 3 by action of gravity.

Figure 6:
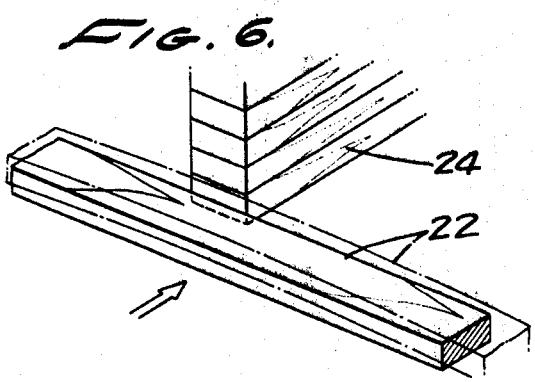
FIG. 6 shows the inter-relationship of several bed frame members to illustrate the manner in which the pendulum jack of FIGS. 3 through 5 prevents the feeding of more than one member at a time from the magazine.

The height of the upper end of pendulum jack 68 above the table plane is such that when the lowermost center strip 24 is of straight lumber the filler strip 22 pushed by pusher 52 engages about the bottom one-third of the lowermost center strip 24. This is seen in FIG. 3. Thus, upon forward motion of the conveyor, filler strip 22 pushes the lowermost center strip 24 out of its magazine and along the conveyor table. When pusher 52 passes pendulum jack 68, as is seen in FIG. 4, the pendulum jack swings out of the way until the pusher is clear. Thereupon, pendulum jack 68 is swung back to its upright position by the action of gravity. The next lowermost center strip 24 is held sufficiently high by the pusher so that pendulum jack 68 can swing to this position to hold the next center strip in position for withdrawal. The reason for the pendulum jack is best illustrated in FIG. 6 wherein a warped filler strip is illustrated in dotted lines. Since the center of filler strip 22 is raised, it would engage the two lowermost center strips 24 in the magazine, if pendulum jack 68 were not employed. With such engagement, the next to the bottom filler strip would not be free from its guide 68, and the guide would be bent as pusher 52 moves the filler strips forward. However, by employment of the pendulum jack only one center strip is engaged and no damage results.

SIDE RAIL MAGAZINES

Referring to FIGS. 1 and 16 through 19, the side rail magazines and the side rail feeders are shown therein. As is seen in FIG. 1, the side rail magazine for carrying side rails 12 comprises side rail guides 72 and 74. Similarly, the side rail magazine for carrying and feeding side rails 14 comprises side rail guides 76 and 78. The magazines and their side rail feed structure are symmetrically identical, and accordingly only the side rail magazine for feeding side rails 14 is illustrated in detail, in FIGS. 16 through 19. As is seen therein, magazines 76 and 78 comprise upright channels with the open sides facing each other. These channels are of sufficient dimension as to hold an appropriate number of stacked side rails 14. The guides are mounted upon frame 46 and the flanges directed toward the conveyor chains terminate at a sufficient height above the table plane to permit the feeding of a single side rail at a time toward the conveyor chain.

As is illustrated in FIGS. 16 through 19, stop discs 80 and 82 are rotatably mounted upon the frame upon a vertical axis. The tops of the stop discs lie in the plane of the table, a portion of which is seen at 84. Thus, side rails placed in the magazine descend until the lowermost rail rests upon the top of stop discs 80 and 82.

Drive crank 86 is pivotally connected to each of the stop discs and is connected to cylinder 88. Stop discs 80 and 82, drive crank 86 and cylinder 88 are shown in their rest positions in FIGS. 16 through 18. Upon actuation of cylinder 88, stop disc 80 rotates in the clockwise direction, as is seen in FIG. 17. Pusher wheels 90 and 92 are respectively pivotally mounted upon a vertical axis upon stop discs 80 and 82. They are mounted away from the axis of rotation of the stop discs and are positioned so that in the rest position of FIGS. 16 through 18 they lie just outside of the lowermost side rail 14 in the magazine. Thus, by rotation of the stop discs in the clockwise direction, from the position of FIG. 18 to the position of FIG. 19, the lowermost side rail 14 is thrust out of the magazine onto the table. Side rail limit position is determined by one or more stops 94, in the form of wheels which are mounted upon trailing links so that they can rise above the pusher and filler strip as it comes by. Each stop wheel 94 is rotatably supported on a wheel shaft 375 which in turn is carried on the lower end of a trailing link 376, the trailing link 376 being inclined at an angle with its lower end shown in FIG. 19 pointing toward the nailing head 32 while its upper end (not specifically shown) points toward the rear filler strip magazine and is rotatably supported on a frame portion, not shown.

Pusher wheels 90 and 92 have their top edges beveled so that upon variations in thickness, and particularly thinner bottom side rails 14, the pusher wheels are able to feed onto the conveyor table a side rail 14 which is slightly undersize, without damage to the structure. In order to prevent the next side rail 14 from falling down, and to prevent it from causing too much frictional drag upon stop discs 80 and 82, the stop discs are provided with support rollers 96 and 98. These rollers are mounted upon a bearing block 100 and are positioned substantially circumferentially of the stop discs. Their upper roller surfaces lie in a plane substantially at the top of pusher wheels 90 and 92. Thus, as the stop discs rotate to the position of FIG. 19, which is the terminal, feed position, the weight of the remaining side rails is carried upon the support rollers as well as upon the top of pusher wheels 90 and 92. In this way ease of operation is accomplished.

Actuation of cylinder 88 is accomplished by an air valve which actuates cylinder 88 as the conveyor advances. A dog on the conveyor chain actuates the cylinder at an appropriate point so that the side rails are fed onto the table to be engaged by pusher 52. These side rails are positioned outside of filler strip 22, with the filler strip therebetween at the rear end of the bed frame. After the full feed stroke of the side rail feeders, the air valve is released by a conveyor dog to return the side rail feed structure to the rest position shown in FIGS. 16 through 18. Thereupon, the next side rail 14 falls into place on top of stop discs 80 and 82 to be ready for the next feed operation.

FRONT FILLER STRIP MAGAZINE AND END ROUND MAGAZINE

As is seen in FIG. 1 the front filler strip magazine is next positioned in the direction of conveyor travel beyond the side rail magazines. The front filler strip magazine is comprised of guides 102 and 104 and is arranged to carry a plurality of front filler strips 20 for positioning in front of center strip 24 and between side rails 12 and 14. This filler strip is next deposited in the bed frame as it is assembled. The filler strip magazine is shown in more detail in FIGS. 7, 8 and 9. Similarly to the rear filler strip magazine, the front filler strip magazine comprises a pair of facing channels which form the guides 102 and 104, of appropriate size to guide the ends of the front filler strips. As is best seen in FIG. 8, the guides 102 and 104 are provided with bottom stops 106 and 108 which prevent the bottom filler strip from engaging upon the conveyor or the partially assembled bed frame positioned thereon. Additionally, the guides carry front stops 110 and 112 which are positioned at a proper distance above the bottom stops to permit only one filler strip to be moved in the forward direction off of the bottom stops at one time. The feed means for feeding the bottom filler strip off of the bottom stops is the same as the feed means employed in connection with the end round magazine and feed structure. Accordingly, the feed structure will be described in detail with respect to the end round magazine.

As is seen in FIGS. 1 and 7 through 15, the end round magazine is comprised of end round guides 114 and 116 which are again in the form of channels having their open sides facing each other. These channels are of sufficient size to accept and guide the ends of the end rounds. In view of the fact that both the front and rear end rounds are from the end round magazine, it is conveniently of a greater height, as compared to the filler strip magazines, so as to be able to carry more end rounds. Due to the greater height, the tops of guides 114, 116 are conveniently secured together by brace 118 for additional rigidity.

In FIGS. 47 and 48 the corners of the bed frame, including the end rounds, are shown as being rounded; however, both the side rails and the end rounds have square corners, and are rounded off in a separate process after the bed frame has been nailed.

Similarly to the filler strip guides, the end round guides 114, 116 have bottom stops 120 and 122 which hold the bottom-most end round from directly downwardly escaping from the guides of the magazine onto the conveyor. Instead, the sides of the guides in the direction of conveyor travel are open to a sufficient height to permit discharge of one and only one end round at any one time.

Referring particularly to FIGS. 9 through 15, end round guide 114 carries operating cylinder 124. Operating cylinder 124 comprises an air cylinder 126 which is actuated by an air valve positioned underneath the conveyor which in turn is actuated by dogs upon the conveyor. An appropriately high pressure air supply is furnished to the valve so that when a valve signals cylinder operation, air cylinder 126 is stroked substantially independently of the load on the feed mechanism. Air cylinder 126 is a double-acting cylinder and its operating valve is a reversing valve so that the air cylinder is returned to its rest position after actuation. Hydraulic cylinder 128 is also a double-acting hydraulic cylinder and is mounted so that it has the same cylinder body mounting and shares piston rod 130. Hydraulic cylinder 128 has its ends connected together through hydraulic line 132. The viscosity of the oil in cylinder 128, together with the restriction provided by hydraulic line 132 provides speed control for piston rod 130. Thus, piston rod 130 does not operate at a fast speed under light loads or a slow speed under heavy loads. By this means, an appropriate air pressure can be supplied to air cylinder 126 to permit feeding, even under heavy loads without excessive feed speeds at light loads.

The upper end of operating cylinder 124 is pivoted upon bracket 134 so that the operating cylinder can swing as the end of its piston rod moves on an arcuate path. Bracket 136, as can be seen in FIG. 10, is bifurcated and is secured to end round guide 114. Bell crank 138 is pivotally mounted between the arms of bifurcated bracket 136 upon pivot pin 140. The upper, substantially horizontal arm of bell crank 138 is pivoted in yoke 142 by means of pivot pin 141. Yoke 142, in turn, is secured to piston rod 130. Thus, upon actuation of operating cylinder 124 bell crank 138 moves about its pivot pin 140.

Pusher rod 144 is slidably mounted in guide 146 and at its rear end carries pivot mount 148. The lower end of bell crank 138 is pivoted to pivot mount 148 by means of pivot bolt 150 so that pusher rod 144 moves with the motion of piston rod 130.

Guide 146 is mounted on guide plate 152. Bolts 154 and 156 are secured in guide plate 152 and extend through oversized holes in bracket 158. Bracket 158 is in turn secured to the frame through end round guide 114. Compression springs 160 and 162 are respectively positioned on bolts 154 and 156 between bracket 158 and the nuts on the tops of the bolts. By this means guide plate 152 is urged upwardly against the bottom of bracket 158.

In the rest position of FIG. 9, the bell crank is oriented in such a manner that pusher rod 144 is substantially horizontal and guide plate 152 is against bracket 158. In this position, the push rod 144 is directed toward the bottom end round in the end round magazine. As the bell crank swings in the counterclockwise direction to cause feeding of the bottom end round, the circular arc motion of pivot pin 150 causes angularity of pusher rod 144. This is illustrated in FIG. 14 where it is seen that end round 16 is thrust partly out of the magazine and tilting of guide 146 is permitted by the oversized holes in bracket 158, as compared to the bolts passing therethrough. At the end of the feed stroke, as seen in FIG. 15, the end round is clear of the magazine and is appropriately positioned upon the bed frame. When the end round clears the magazine the weight of the remaining end rounds in the magazine would cause unnecessary overload on retraction of pusher rod 144, if it were not for its resilient guide mounting. However, when the bottom end round being fed clears the magazine, and the remaining end rounds descend in the magazine, pusher rod 144 is permitted to resiliently deflect downwardly, as is illustrated in FIG. 15 so that lateral overloading does not occur.

Each end of the end round magazine is equipped with identical feed structure. For example, FIG. 7 illustrates an operating cylinder 164 with its piston rod 166 and operated bell crank 168. As is seen in FIG. 8 it includes a pusher rod 170. These are identical to operating cylinder 124, piston rod 130, bell crank 138 and pusher rod 144. The remaining structure including the resilient guide mounting of the pusher rod 170 is identical to that described with respect to the feeder mechanism on end round guide 114.

Referring to FIG. 9, the feed mechanism for the front filler strips is very much the same as that described with respect to the end round feed mechanism. However, rather than having an interconnecting linkage, the piston rod is direct acting as a pusher rod. Operating cylinder 172 is preferably a double air and hydraulic cylinder structure as previously described. Its front mounting foot 174 has oversized holes therethrough, and bolts, one of which is seen at 176 are secured to the frame and passed through the oversized holes in the mounting foot. Springs 178 are compression springs urging the mounting foot against the frame. Piston rod 180 is directed at the back of the lowermost filler strip in the filler strip magazine so that upon actuation of the operating cylinder 172 piston rod 180 extends and thrusts the lowermost filler strip from the magazine. When the filler strip clears the magazine the stack of filler strips in the magazine rest upon the side of the piston rod 180, but piston rod 180 swings downwardly, compressing springs 178. Thus, undue side load on the piston rod is eliminated. The rear end of operating cylinder 172 is preferably pivotally mounted to freely permit the desired motion. An identical feed structure is positioned at the bottom of each of the filler strip guides, with piston rod 182 shown on the opposite side in FIG. 8. Actuation of filler strip feed is caused by an appropriate dog on the conveyor so that a front filler strip is appropriately placed in the assembling bed frame at the proper conveyor position.

SLAT MAGAZINE AND SLAT FEED

As is seen in FIG. 1, the magazine for feeding slats 26 comprises slat guides 182 and 184. Again these guides comprise channels with their open sides directed toward each other. The channels are appropriate size to accept and guide slats 26. They are each provided with a bottom stop and a forwardly directed opening so that one slat at a time may be fed onto the bed frame being assembled. The feed structure is substantially identical to the feed structure previously described for the feeding of end rounds. Feed means 186 and 188 are illustrated. They each have an operating cylinder, a bell crank and a resiliently mounted pusher rod. Thus, feeding of slats is accomplished identically to the feeding of end rounds.

However, actuation of the feed means 186 and 188 is accomplished from switch actuator 36. As was previously described, dogs comprising screws 42 cause stopping of the conveyor and actuation of the nailing head at each longitudinal nailing location along the bed frame. Since there are as many slat nailing locations along the length of the bed frame as there are slats 26, switch actuator 36 conveniently also actuates slat feeding.

Switch 190, see FIGS. 49 through 53, is mounted on bracket 192 which is secured to the side of the nailing head 32 adjacent switch actuator drum 36. Bracket 192 is conveniently in the form of a channel having a longitudinal slot throught the web thereof. A bolt extends through the slot, and nut 194 is arranged to be manually tightened upon the bolt, see FIG. 51. By this means, switch 190 can be moved along bracket 192 to be in operating position with respect to any one of the disc pairs 38 and 40.

As previously described, switch 44 stops conveyor feed and initiates nailing head operation each time it is actuated by the dogging action of screw heads 42. However, since the slat magazine is positioned earlier along the conveyor length than the nailing position, it is desired to earlier actuate the feeding of slats from the slat magazine. Thus, switch 190 is angularly positioned around switch actuator 36 at an appropriate angle corresponding to the horizontal distance between the slat magazine and the nailing position. Furthermore, it is not desired to actuate feeding the slat from the slat magazine at each nailing position along the length of the bed frame, because there are nailing positions on the end rounds as well as on the slats. For this reason, the screws 42 which correspond to slat nailing positions carry actuating tabs 196 thereunder. As is seen in FIGS. 50 through 53, actuating tabs 196 extend into the space between pairs of discs 38 and 40. Accordingly, switch 190 is positioned to be actuated by the portion of the actuating tab extending over the space. This is best illustrated in FIGS. 51 and 53. Thus, actuating tabs 196 are placed under screw heads 42 for each screw which represents the nailing of a slat. The screws 42 which represent the nailing of end rounds carry ordinary washers so that switch 190 is not actuated. Switch 190 in turn actuates an air valve for the actuation of both feed means 186 and 188. By this means, a slat is fed for each slat to be nailed.

TENSION LOCK

Chain 50, pusher 52 secured thereto and pusher extension 58 are again seen in FIGS. 20 and 24. Rear filler strip 22 and rear end round 18 are shown as engaged thereagainst. Tension lock 198 is positioned to engage against the rear fillter strip and rear end round to hold them against the pusher and its extension so that they are properly maintained in place during the feeding and nailing of the bed frame.

There appears to be some inconsistency in FIG. 20, in that if pusher extension 58 is tall enough to dislodge the rear filler strip 22 from its magazine 54, 56, then it would appear that this filler strip would have previously been dislodged by the tension locks 198, and more specifically by the slider blocks 228 thereof. The drawing is not to scale, however, and the pusher extensions 58, 60 may if desired be made to rise significantly higher than the slider blocks 228. See FIG. 5 where the pusher extensions 58, 60 are also shown. Alternatively, rather than have the pusher extensions 58, 60 directly act upon the rear filler strip 22 for purpose of dislodging it, the pusher bar 52 itself, or its end extensions or upward extensions, may be used to activate a discharge or ejector mechanism at the proper time so that the filler strip 22 will be discharged upon the conveyor in front of the pusher bar 52. The ejector mechanism may be any one of several conventional types.

Base plate 200 is secured onto chain link 202, as is seen in FIG. 21. Base plate 200 extends rearwardly over the top of and between the top edges of the chain link 204, but merely rests thereon and is not secured thereto. Boss 206 is in the form of a channel with upwardly extending flanges and is secured on the front end of base plate 200. Pivot pin 208 extends across the boss. Links 210 and 212 are pivotally mounted upon pivot pin 208 and carry roller 214 thereon. Additionally, cross bar 216 extends between and is secured to links 210 and 212. Compression spring 218 is engaged between the base plate 200 and cross bar 216 to urge links 210 and 212 in the clockwise direction as is seen in FIGS. 20 and 24.

Pivot pin 220 is carried in the ends of links 210 and 212 and engages through links 222 and 224. Links 222 and 224 are in turn pivoted on bolts 226 which are secured in slider block 228. Slider block 228 is maintained in sliding relationship on base plate 200 by means of securing screw 230 which engages on the top of the slider block and is secured into the base plate. In order to permit the necessary sliding, securing screw 230 passes through elongated hole 232 in the slider block. Loading pins 234 and 236 are slidably mounted in the slider block and are positioned at such height as to substantially engage in the center of the filler strip 22 and rear end round 18, as is seen in FIGS. 20 and 24. Loading pins 234 and 236 are spring loaded to an extended position, as is shown in FIG. 20, and can be stressed back into the slider block. When pivot pin 220 is in the raised position, where it is urged by means of compression spring 218, there is sufficient clearance between pusher 52 and loading pins 234 and 236 to permit the entry of the rear filler strip and rear end round. After such loading, the conveyor moves forward, so that roller 214 passes under cam 238 resiliently carried by the machine frame. This presses pivot pin 220 downward so that loading pins 234 and 236 are pressed against the filler strip and end round. Pivot pin 220 continues to move downwardly to push the loading pins 234 and 236 into slider block 228. The downward motion continues until pivot pin 220 lies below the plane of pivot bolts 226 and 208. In this position it is in the overcenter position and the stress of loading pins 234 and 236 overcomes the stress of spring 218 so that it is maintained in this position. Loading pins 234 and 236 thrust the filler strip and rear end round against the pusher bar. Thus, these parts of the bed frame are retained in position.

As the conveyor moves forward during assembly of and nailing of bed frames, link 202 finally reaches the front end of the conveyor beyond the nailing station under nailing head 32. At the front end of the conveyor the conveyor chain 50 passes around the sprocket. This relative curvature introduced between the link to which base plate 200 is secured and the link to which pusher bar 52 is secured causes relative opening of this part. This opening releases the rear end round and rear filler strip to unload loading pins 234 and 236. Now there is no force holding pivot pin 220 in the downward position, and spring 218 raises pin 220 to the raised position and retracts slider block 220. Thus, it is ready for the next insertion of bed frame parts. In view of the fact that the normal loading of the bed frame due to conveyor motion is against pusher bar 52, only one tension lock 198 is required. The tension lock need not be duplicated on both chains under most conditions, but can be so employed if desired.

STOP JIG COMPENSATOR

Stop jig compensators 240 and 242 are respectively secured to chains 48 and 50. They are secured at an appropriate distance with respect to the pusher bar which engages the rear end round and filler strip so that the front end round 16 and front filler strip 20 are positioned just in front of the stop jig compensators. Stop jig compensator 242 is shown in more detail in FIGS. 25 through 27, and will be described in detail. It is understood that stop jig compensator 240 is identical, and thus need not be described.

Figures 26, 27:
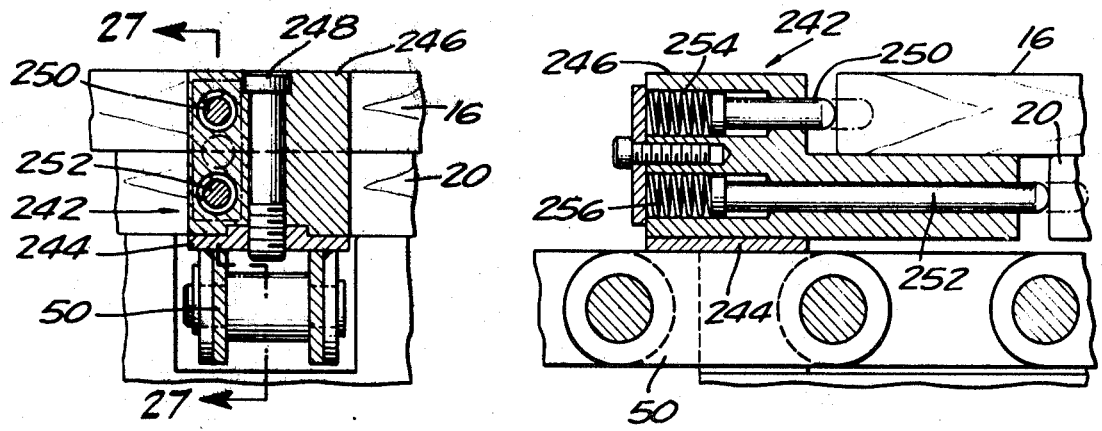
FIG. 26 is an enlarged sectional view taken generally along the line 26—26 of FIG. 25.
FIG. 27 is a section taken generally along the line 27—27 of FIG. 26.
Figure 28:
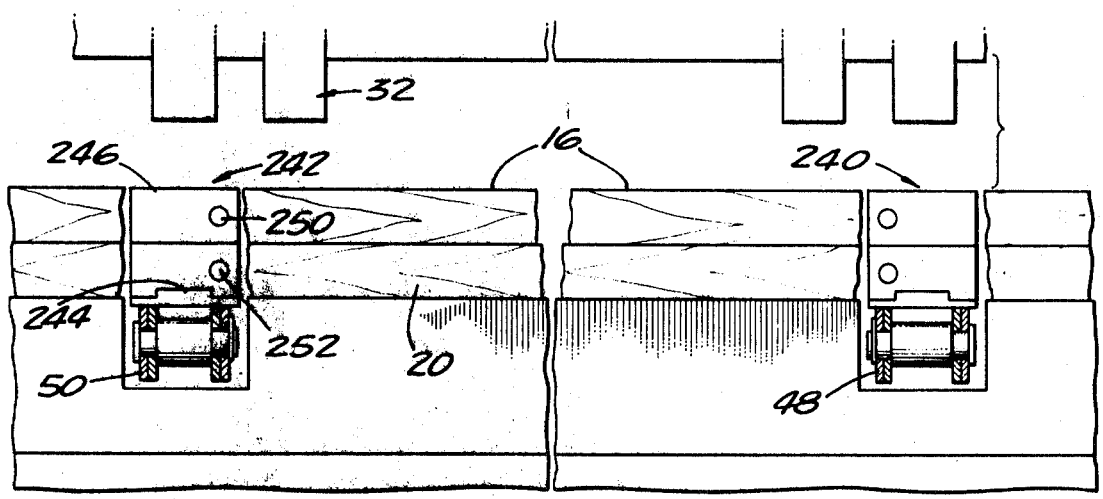
FIG. 28 is a section taken generally along the line 28—28 of FIG. 25.
Figure 35:
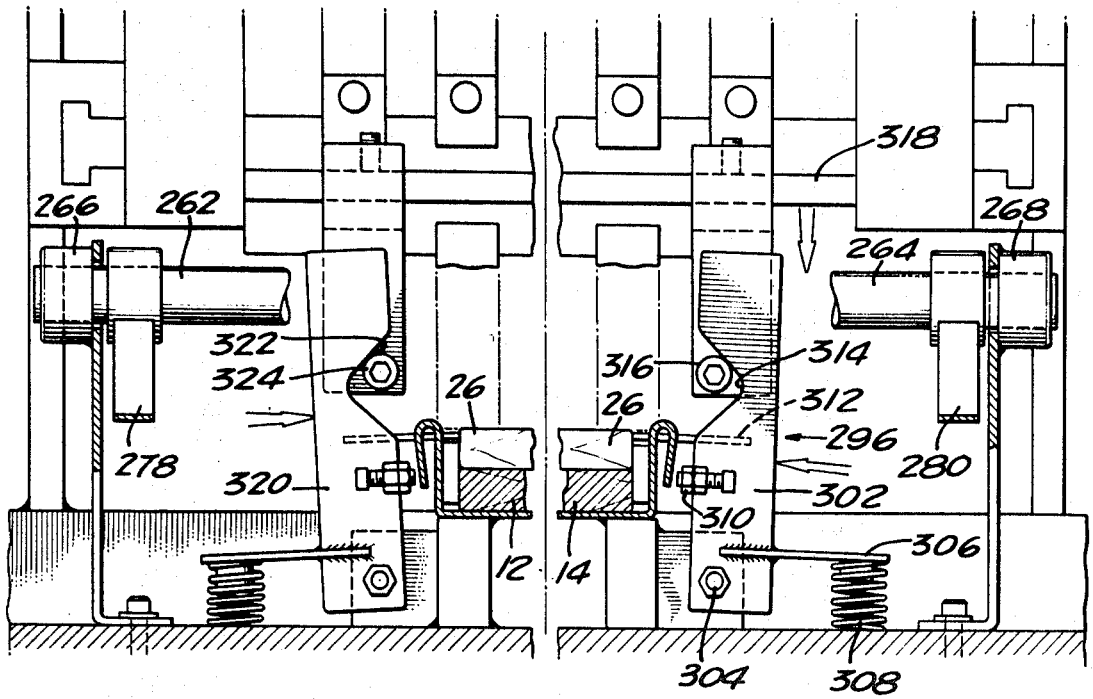
FIG. 35 is an end elevational view, with parts broken away, showing the slat centering device.
Figure 36:
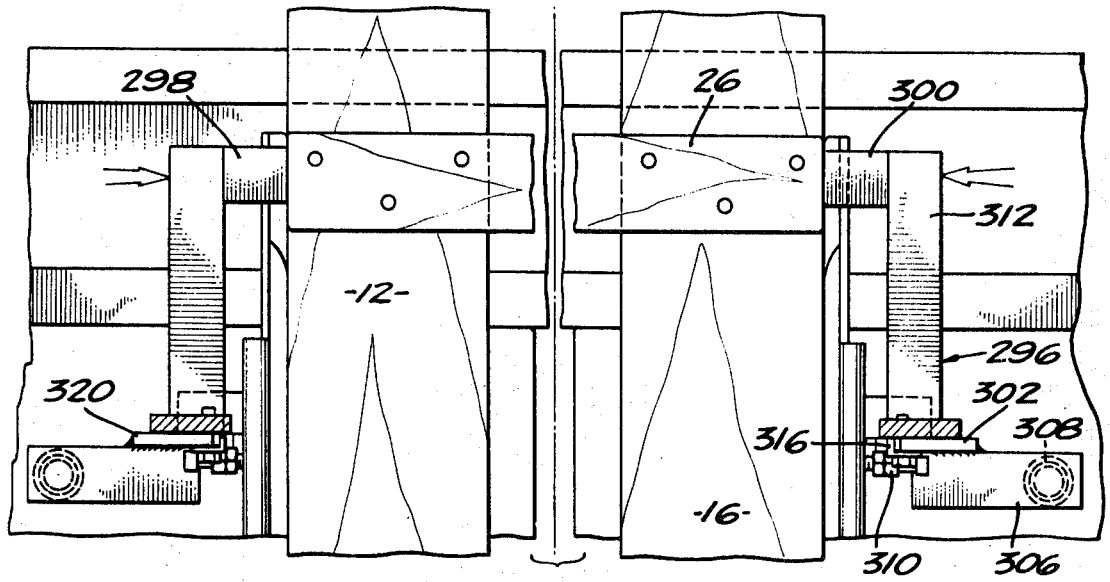
FIG. 36 is a top plan view thereof.
Figure 37:
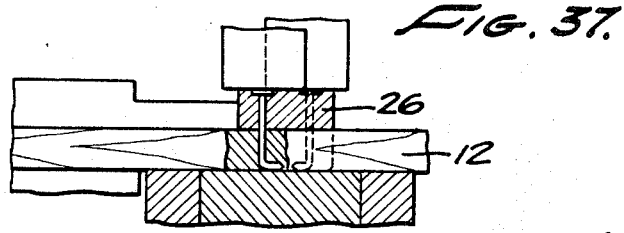
FIG. 37 is a partial sectional view through a portion of the bed frame showing the nailing chucks in position against a slat and showing the slat securing nail driven through and clinched in the bed frame.
Figure 43:
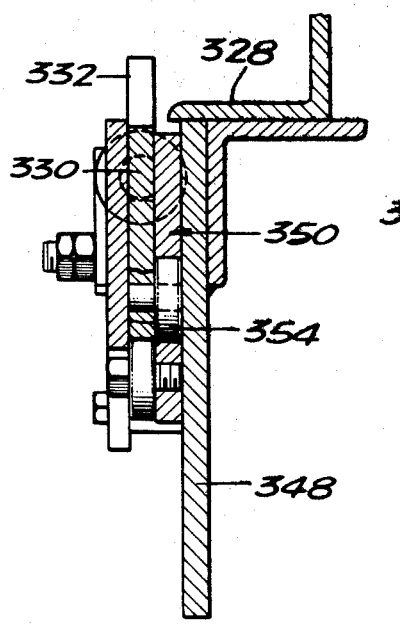
FIG. 43 is a section taken generally along the line 43—43 of FIG. 39.
Figure 44:
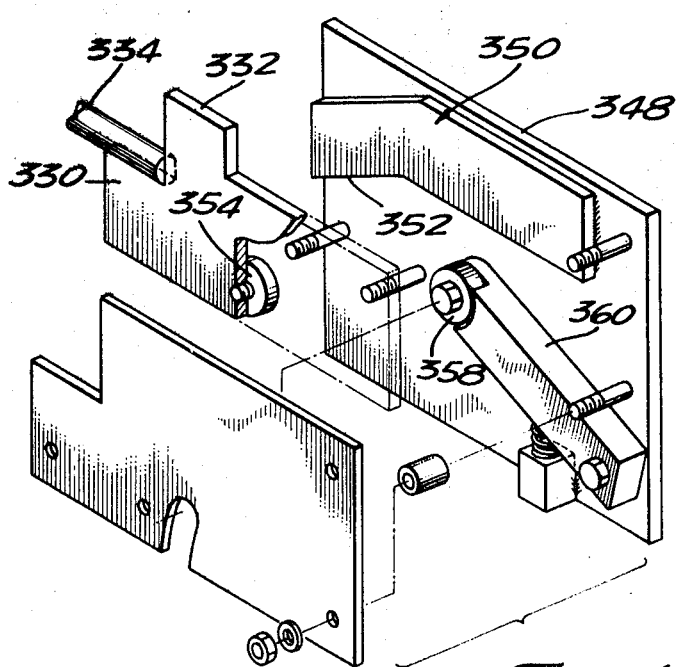
FIG. 44 is an exploded view of the tension compensator of FIG. 39.

Stop jig compensator 242 comprises base plate 244 which is secured to one of the links of chains 50 as is seen in FIG. 26. Compensator block 246 is secured to the top of base plate 244 by means of screw 248. Compensator block 246 has openings therethrough in the direction of conveyor motion. Loading pins 250 and 252 are positioned in those openings and are spring loaded in the forward direction by compression springs 254 and 256, respectively. Heads on the loading pins appropriately limit forward motion of the pins so that they do not come free of their openings.

During assembly of the bed frame, filler strip 20 and end round 16 are positioned adjacent the stop jig compensators, and virtually lie against the loading pins. When the front of the bed frame reaches the nailing station, the front end round and filler strip are the first parts to be nailed together. In order to properly align the front edges of these two parts, stop 258, which is part of the nailing head 32, rises up and thrusts rearward to an appropriate stop position. In this position, the front end round 16 and front filler strip 20 are thrust into alignment and cause the loading pins to be thrust partway into compensator block 246. The pins in turn hold these parts against stop 258. Thus, these parts can be nailed together with their front ends in alignment. After the nailing operation is complete, mechanism in nailing head 32 retracts stop 258 through the position shown in FIG. 29 to a position where it is below the path of the bed frame as the conveyor moves forward. Thus, stop 258 does not form an obstruction to further bed frame movement.

LONGITUDINAL SLAT POSITIONER

The structure which positions slats 26 longitudinally of the bed frame as each individual slat is successively nailed is generally indicated in FIGS. 1, 29, 31, 32, 33 and 38 at 260.

Shafts 262 and 264 are axially aligned and are mounted in bearings 266 and 268 which are respectively mounted upon the frame. Positioner arms 270 and 272 are respectively mounted upon shafts 262 and 264. They are arranged so that they can be positioned along the shafts so that lateral adjustment is possible for a different width of bed frames. However, for a particular bed frame width the arms are maintained in the particular position. In order to permit the arms to independently move, shafts 262 and 264 are joined by collar 274, see FIG. 30. Collar 274 is fixed to shaft 264 by means of screw 276, and shaft 262 is free to rotate within collar 274. Positioner arms 278 and 280 are respectively secured to shafts 262 and 264 so that the operator can manually lift positioner arms 270 and 272 from either side of the machine. Furthermore, if desired, compression springs can be installed under lift levers 278 and 280 to urge the positioner arms 270 and 272 in a downward direction. However, normally such springs are not employed because gravitational forces are sufficient.

Both positioner arms 270 and 272 carry the same structures on their ends, and together form the longitudinal slat positioner 260. Accordingly, only the structure mounted upon positioner arm 270 will be described, it being understood that the structure on positioner arm 272, and its operation, is identical. As is best seen in FIGS. 32, 33 and 38, stop holder 282 is pivoted on the end of positioner arm 270 by means of pivot pin 284. Stop 286 is secured to the front end of stop holder 282 and is positioned so that stop 286 can engage on the front side of a slat 26, as is shown in FIG. 32. Positioner arms 270 and 272 are prevented from swinging too low and engaging upon other lower parts by means of an adjustment screw above each of lift levers 278 and 280. These adjustment screws serve as bottom limit adjustment stops.

Stop holder 282 is urged into the position indicated in FIG. 32 by means of push rod 288 which is pivoted to the top of stop holder 282 at its forward end, and passes through bracket 290 at its rear end. As is seen in FIG. 33, bracket 290 is secured to the side of positioner arm 270. Compression spring 292 is engaged around push rod 288, between a shoulder thereon and bracket 290. Thus, stop holder 282 is urged to the position shown in FIG. 32. Stop means prevent further rotation in the clockwise direction seen in FIG. 32. Such stop means can be conveniently a cross pin through the rear end of push rod 288, or by engagement of stop holder 282 on the end of positioner arm 270.

Tooth 294 is pivotally mounted upon the underside of positioner arm 270, and has a downwardly directed point just to the rear of stop 286. By the construction previously described with respect to slat feeding, an appropriate number of slats is placed upon the bed frame as it is being assembled. These slats are positioned slightly ahead of the positions where they are to be ultimately nailed. Thus, as the bed frame advances a slat is engaged by the stops 286 on positioner arms 270 and 272 so that the slat 26 is held until the conveyor stops for slat nailing. Tooth 294 engages the slat and prevents kickback. After nailing, further conveyor motion causes deflection of the stop 286, as is shown in FIG. 38 so that the slat is released from the stop and the bed frame is permitted to move forward. Thereupon the longitudinal slat positioning structure 260 is ready to engage other slat for longitudinal positioning prior to nailing.

LATERAL POSITIONER

As is seen in FIG. 2, the end rounds and slats lie on top of the remaining bed frame structure, and are not afforded substantial lateral position control before the nailing step. Accordingly, the centering device generally indicated at 296 in FIGS. 1, 31, 34, 35 and 36 provide this lateral positioning function. In the centering device 296 there are two centering fingers, one on each side of the bed frame. The fingers are indicated at 298 and 300 in FIG. 36. In view of the fact that the structures are symmetrically identical, only in each portion of the centering device 296 in conjunction with centering fingers 300 will be described in detail. Centering lever 302 is pivoted at 304 to the frame of the machine. Spring arm 306 is secured to centering lever 302, and compression spring 308 thereunder urges centering lever 302 in the counterclockwise position. Stop bolt 310 defines the inward limit of unrestrained travel. Arm 312 is secured to centering lever 302 and carries centering finger 300 on the end thereof. Centering finger 300 is directed toward the slats when they are at the nailing position.

Cam face 314 is angularly cut in one side of centering lever 302 and cam drive roller 316 is engageable thereagainst. Cam drive roller 316 is mounted upon cross bar 318 which is secured to a portion of the nailing head that comes downward on the nailing stroke. Thus, upon descent of cross bar 318, roller 316 moving along cam face 314 permits centering lever 302 to swing in the counterclockwise direction, driven by spring 308. This moves centering finger 300 toward the slat in position between fingers 298 and 300.

Centering finger 298 is carried upon a centering lever 320 which is controlled by a spring and cam face 322 acting in conjunction with cam drive roller 324, identically to the structure described with respect to centering lever 300. Thus, as the two fingers move inwardly on the down stroke of the main slide of the nailing head, both fingers 298 and 300 move inward toward the slat. The first one that engages the slat thrusts the slat transversely under the impetus of the appropriate compression spring. The slat is moved until it is engaged by the other centering finger. At this point the force is in balance, and cam drive rollers 316 and 324 can leave the cam faces for completion of the downward stroke. In such a circumstance, the slat is properly positioned and is nailed in place. When the nailing stroke is over, and the main slide of the nailing head rises to raise cross bar 318, the centering fingers are retracted by action of the cam drive rollers on the cam faces. They are returned to the outer position, ready for the next slat.

TENSION COMPENSATOR

Figure 25:
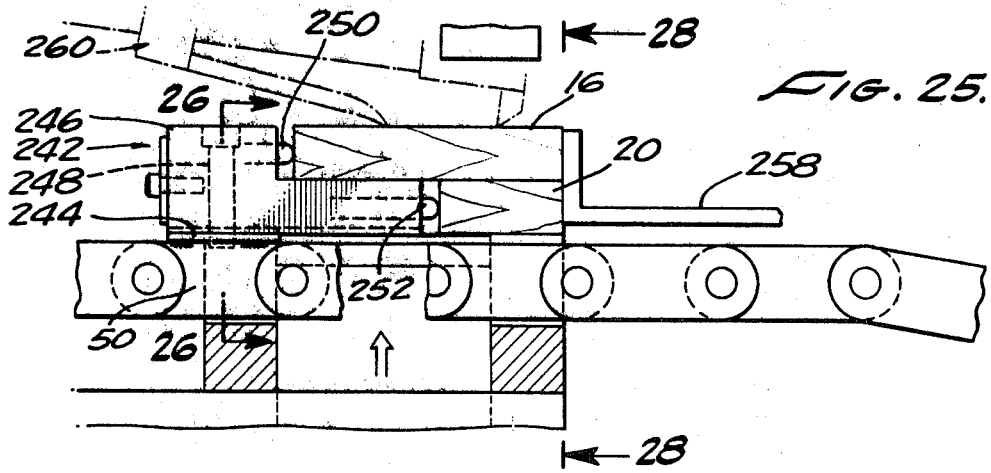
FIG. 25 is a side elevational view of the stop jig compensator which positions and restrains bed frame members on the other end of the assembled bed frame, showing the stop jig compensator in the restraining position.

As previously described, the stop jig compensator shown in FIGS. 25, 26 and 27 holds the front end round 16 and front filler strip 20 in position during nailing of these bed frame elements to the side rails 12 and 14. As the bed frame progresses through the nailing head from one nailing position to the next, each of the slats is positioned. Progress is caused by pusher 52 acting against the rear end round and rear filler strip, as well as against the side rails. The only resistive force which causes the parts to stay together in the longitudinal direction is the resistance of the bed frame as it slides along the table. Thus, when the last nailing of the rear end round 18 and rear filler strip 22 is accomplished onto the side rails and center strip, any longitudinal gap such as G in FIG. 48 must be closed. This is accomplished by the tension compensator generally indicated at 326 in FIGS. 39 through 46 and 48. As the bed frame proceeds from nailing head 32 it is guided by a pair of angle iron rails, one of which is shown at 328. These rails are spaced at an appropriate distance to engage under the side rails and support the nailed end of the bed frame as it is fed out of the nailing machine. When the bed frame is in position for the nailing cycle which nails the rear end round to the side rails, tension compensator 326 resiliently engages the front of the bed frame to provide the necessary resistive force to pusher 52 to longitudinally close any gaps in the frame.

Stop plate 330 carries stop face 332 which is normally positioned above the lower portion of guide rail 328 so that the face can engage the front of the front filler strip as the bed frame proceeds along the guide rails. Rod 334 is secured to stop plate 330 and is slidable within guide 336. Guide 336 is in turn pivoted by pivot pin 338 to rail 328, see FIG. 42. Compression spring 340 is engaged around rod 334 between guide 336 and collar 342 secured on rod 334. Spring 340 thus urges rod 334 and stop plate 330 to the right, as is seen in FIGS. 39, 40, 45 and 46. Rightward limit of the motion is controlled by collar 344 which is secured to the outer end of stop rod 334, outside of guide 336. Rubber bushing 346 is preferably positioned between stop collar 344 and guide 336 to minimize shock.

Side plate 348 is secured to rail 328. Side plate 348 in turn, carries on its interior surface cam rail 350, see FIGS. 43 and 44. Cam rail 350 has a straight section, parallel to rail 328, and toward the direction of bed frame motion along rail 328, and has a downwardly directed section 352. Cam follower 354 is mounted on stop plate 330 and engages against the lower, cam side, of cam rail 350. Press roll 358 is rotatably mounted on the end of pivoted link 360, which is spring urged upwardly. Press roll 358 bears against the straight bottom surface of stop plate 330 to hold cam follower 354 in engagement with the lower guide surface of cam rail 350.

Thus, when the front end of a bed frame first engages stop face 332, the structure is in the position shown in FIG. 39. Forward motion of the bed frame causes spring 340 to apply a resisting load to bed frame motion, to thus close any gap G, see FIG. 48. After the last nailing step is performed, further conveyor advance continues to push stop plate 330 in the forward direction, until stop face 332 disengages from the front filler strip. This downward retraction of stop face 332 is caused by cam follower 354 following down the section 352 of cam rail 350. Once disengagement is complete, the top of stop plate 330 moves to the right under the filler strip, under the urging of spring 340. Thus, on the return stroke cam follower 354 does not follow the lower guide surface of cam rail 350. However, when the top of stop plate 330 is again free of bed frame parts it can move upwardly under the urging of press roll 358. Thus it is returned ready for another action.

Figure 54:
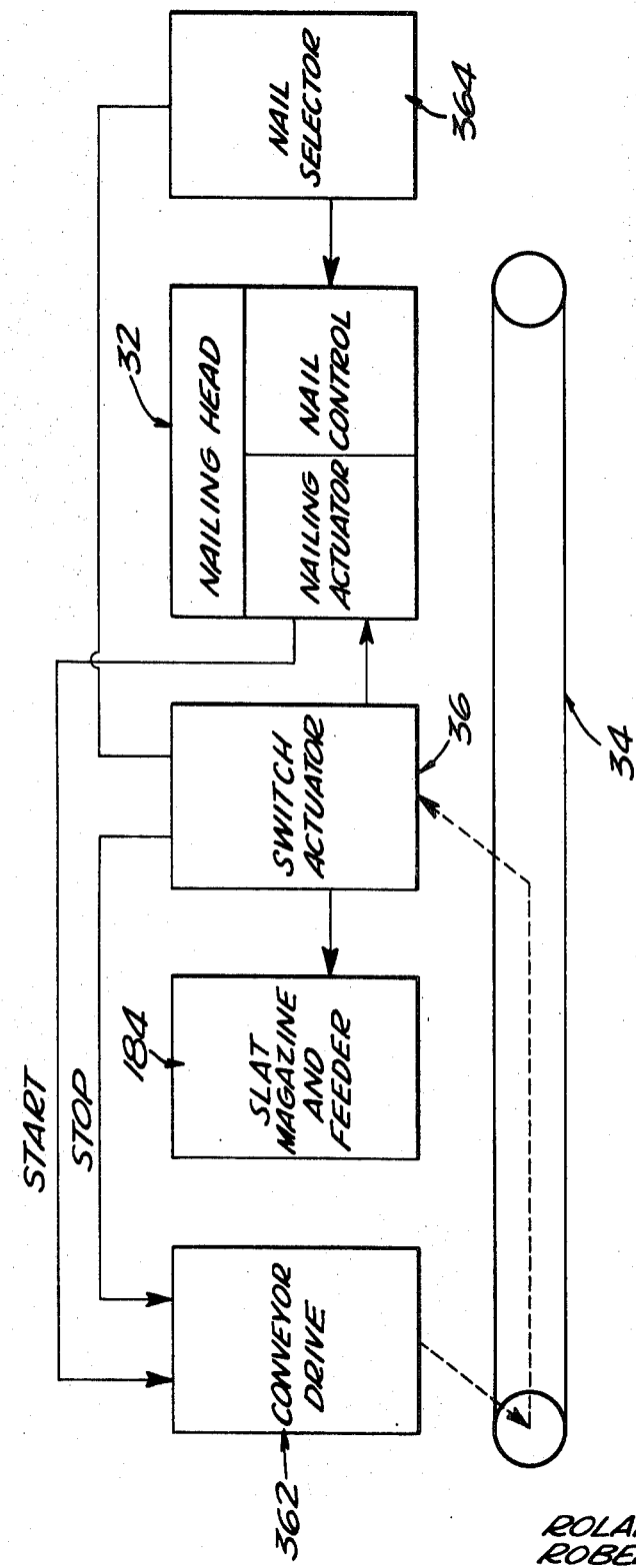
FIG. 54 is a structural schematic diagram of some of the electrical and mechanical interconnections between the various parts of the bed frame nailing machine.

FIG. 54 schematically illustrates the interrelationship of the various parts of the bed frame nailing machine. Switch actuator 36 is driven by the conveyor 34, and when the switch actuator indicates that the conveyor is in a position where nailing is to occur, switch actuator 36 signals conventional conveyor drive 362 to stop the conveyor. At the same time, switch actuator 36 signals nail selector panel 364 that nailing is about to take place. At the same time, switch actuator 36 signals actuation of the nailing head 32 so that nailing takes place. At this time, nail selector 364 controls nail feed so that nails are driven where desired. At completion of the nailing cycle, nailing head 32 signals conveyor drive 362 to again start the conveyor. Thereupon, conveyor 34 moves until a new nailing position is reached, and then the nailing head goes through a nailing cycle with the driving of appropriate nails is determined by the nail selector. These cycles go on continuously until the operator stops the automatic sequencing.

Corner braces 28 and 30 are illustrated as being part of the bed frame. These corner braces are conveniently installed by hand, and may be retained in place until nailing by conventional stops or clamps. These corner strips are dimensioned so that the end adjacent the filler strip is nailed through from the end round, and the end adjacent the side rail is nailed through the appropriate slat 26. Thus, rigid bracing of the bed frame is accomplished. Each of the structures described cooperates with each of the others to accomplish convenient and accurate assembly of a bed frame, with the minimum of effort and a maximum accuracy.

SYSTEM OPERATION

With particular reference to FIG. 47, the bed frame parts to be assembled fall into several separate categories which are handled in different ways.

The parts of the bed frame are assembled by first discharging all of the bottom layer of parts in their approximately correct relative positions. This bottom layer of parts includes the rear filler strip 22, front filler strip 20, side rails 12 and 14, and center rail 24. The rear filler strip 22 and the front filler strip 20 are dropped directly upon the conveyor and are supported upon and propelled forward by the conveyor chains 48, 50. The longitudinal parts including side rails 12 and 14 and the center rail 24 have a sliding support upon respective portions of the frame or table 46. The side rails and the rear filler strip are propelled directly by the pusher 52 which is in turn carried by the conveyor chains. Center rail 24 is propelled by read filler strip 22.

As the assembly of bottom layer parts moves forward the top layer of parts are dropped in their approximately correct relative positions. These include the front end round 16, rear end round 18, and the various slats 26. As is evident from FIG. 1 there is only a single end round dispenser, and also only a single slat dispenser. The slat dispenser is located some distance past the end round dispenser in the direction of conveyor travel. Therefore, the front end round 16 is a first dropped in place, and after a substantial delay the first slat 26 is dropped. The succeeding slats 26 are dropped at closely spaced time intervals. While the latter ones of the slats 26 are being dropped the rearward end of the frame assembly passes the end round dispenser, and the rear end round 18 is dropped in place.

Thus the entire system of apparatus includes seven different dispensers for dispensing the various component parts of the bed frame. There are five separate dispensers for the five parts that are in the bottom layer of the bed frame structure as previously described. There are also the additional two dispensers for the top layer of parts, consisting of one dispenser for both front and rear end rounds, and another dispenser for all of the slats. The dispenser for the slats 26 is controlled by the drum or switch actuator 36 which also controls the operation of the nailing head 32. The action of all the other six dispensers is controlled directly from the conveyor.

Certain control devices are associated with the nailing head operation, and these include the nailing stop 258, the positioning device 260 for controlling the longitudinal position of the transverse members which are to be nailed, the centering device 296 for controlling the centering of the bed frame as a whole, and the tension compensator 326. Each of these control devices, therefore, operates on each of the bed frames as it is being nailed.

The nailing operation is applied to front end round 16, slats 26, and rear end round 18 in sequence, as they arrive at the nailing head 32. Nailing stop 258 is used only for nailing the front end round 16 and front filler strip 20 to the associated ends of the longitudinal parts. Stop 258 rises as a result of a signal received from drum 36, prior to the arrival at the nailing station of the front end of the bed frame and it stops the forward movement of the frame. The front end round 16 and front filler strip 20 are held between the compensator stop jigs 240, 242 and the nailing stop 258 while the nail cycle is executed. Stop 258 is then retracted and is not used again until the arrival of the leading of the next bed frame.

The two slats positioners 260 are used for positioning each one of the entire series of slats 26, prior to nailing by the nailing head 32. As shown in FIG. 25 the positioners 260 remain essentially in their normal position while the front end round 16 and front filler strip 20 are being nailed. However, as best seen in FIG. 38, the stop 286 of positioner 260 is resiliently mounted, and hence lifts itself up over the leading edge of either an end round or a slat, as the case may be, at the appropriate time. In the case of front end round 16 the nailing position is determined by the stop 258 associated with the nailing head, and the front end round receives a hard forward drive from the compensators 240, 242 which are in turn carried by the conveyor chains. The stop 286 of positioner 260 therefore reaches its limit of tension and lifts over the leading edge of front end round 16 prior to the arrival of front end round 16 at the stop 258. In the case of the slats 26, however, they do not receive a hard drive from the conveyor chains, and their nailing position is determined by stops 286 of positioners 260. After a slat 26 has been nailed, it then receives a hard forward drive from the conveyor, causing the stops 286 to be lifted over the slat, as shown in FIG. 38.

The nailing position of rear end round 18 and rear filler strip 22 is determined by the pusher 52 and tension compensators 198, as shown in FIG. 24, rather than by the positioners 260.

Figure 45:
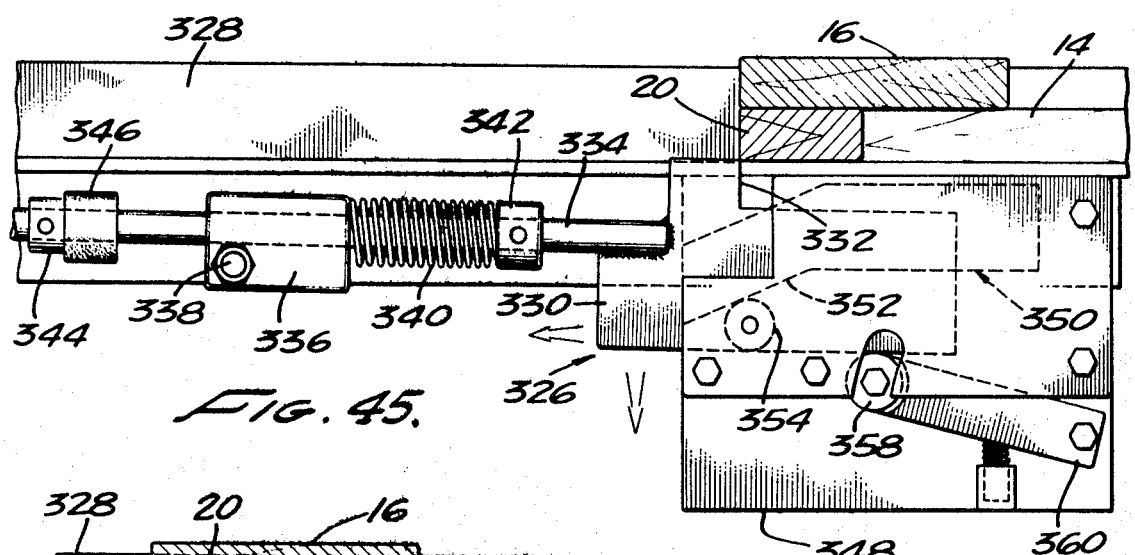
FIG. 45 is a side elevational view of the tension compensator showing the tension compensator approaching the release position as the bed frame moves forward after the last nailing on the bed frame.
Figure 46:
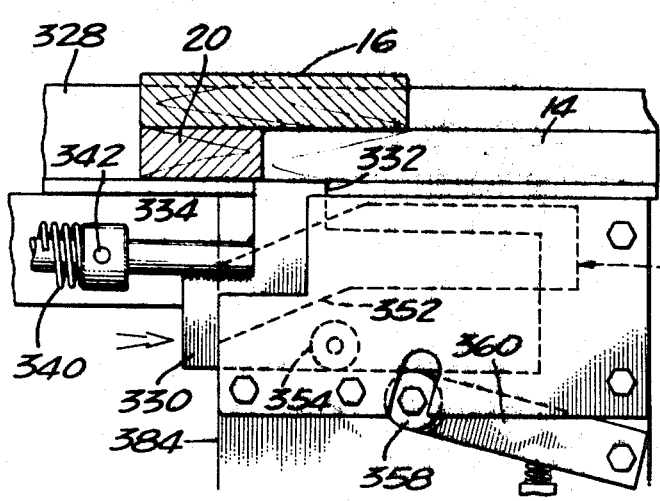
FIG. 46 is a view similar to FIG. 45, showing the tension compensator after release of the bed frame.

Just prior to the nailing of rear end round 18 the forward end of the bed frame engages tension compensator 326 shown in FIG. 48, which resiliently restrains the forward end of the bed frame while the final nailing cycle is accomplished. When the nailing is completed the hard drive of the conveyor is again imparted to the bed frame, which advances and thereby exceeds the predetermined level of tension for which the tension compensator 326 has been set, thereby causing the tension compensator to depress, as shown in FIGS. 45 and 46. Tension compensator 326 remains depressed until the full length of side rail 14 has passed over it.

This invention is particularly described in the specification as being directed to a bed frame nailing machine, and this is the preferred embodiment of the invention. However, it is clear that the invention is equally applicable to the assembly of other wooden structures, and is also equally applicable to the assembly of parts of other materials, providing an appropriate securing machine is employed for the particular materials being assembled. For example, when sheet metal parts are being assembled, a spot welder could be employed as the securing machine. In other types of materials and securing, this invention is equally applicable.

This invention having been described in its preferred embodiment, it is clear that it is susceptible to numerous modifications in embodiments within the ability of those skilled in the art without the exercise of the inventive faculty.

What is claimed as new in support of Letters Patent is:

1. An assembly machine, said assembly machine comprising:
   a nailing mechanism;
   an endless conveyor adapted to carry parts to said nailing mechanism, said endless conveyor having a pusher bar thereon and being adapted to receive a first part positioned ahead of the pusher bar;
   a magazine arranged to carry a plurality of second parts in stacked arrangement and positioned with respect to said conveyor so that a first part pushed by said pusher engages the bottom-most second part in said magazine to withdraw the bottom-most of the second parts from said magazine; and a support positioned under said magazine to hold the lowermost of the second parts above the conveyor but sufficiently low to be engaged by the first part pushed by said pusher bar.

2. The assembly machine of claim 1 wherein said support is a post pivotally mounted on an axis transverse to conveyor motion so that said support post can be swung out of the way of said pusher bar by said pusher bar.

3. A parts feeder, said parts feeder comprising:
a magazine, said magazine being adapted to carry a plurality of parts in stacked configuration, said magazine being oriented in upright position so that parts in said magazine are gravitationally fed toward the bottom of said magazine, a bottom stop on said magazine to prevent free discharge of said parts from the bottom of said magazine;
a pusher bar movably mounted adjacent the bottom of said magazine, motive means for moving said pusher bar, said pusher bar being positioned to eject the bottom-most part from said magazine in a direction at substantially right angles to the direction of parts in said magazine, said pusher bar being resiliently mounted adjacent said magazine and being pivotally mounted away from said magazine so that when said pusher bar pushes the bottom-most part out of said magazine the remaining parts in said magazine can resiliently deflect said pusher bar;
wherein a bellcrank is pivotally mounted on said magazine, one arm of said bellcrank being pivotally mounted to said pusher rod and the other end of said bellcrank being connected to said motive means.

4. The part feeder of claim 3 wherein said motive means comprises a cylinder having a piston rod extending therefrom, said piston rod being pivotally connected to said bell crank and said cylinder being pivotally connected to said magazine.

5. The parts feeder of claim 4 wherein said motive means comprises a double acting air cylinder having a body and a piston rod, and a double acting hydraulic cylinder having a body and a piston rod, said bodies being connected together and said piston rods being connected together, the ends of said hydraulic cylinder being hydraulically connected to limit piston rod speed.

6. An assembly machine, said assembly machine comprising:
a securing machine adapted to secure first and second parts together;
an endless conveyor adapted to carry first and second superimposed parts to said securing machine, said endless conveyor having a puher bar thereon, said pusher bar being adapted to move first and second superimposed parts to said securing machine, a tension lock on said conveyor, said tension lock having first and second resiliently mounted loading pins thereon, said loading pins being adapted to engage first and second superimposed parts to resiliently hold them against said pusher bar.

7. The assembly machine of claim 6 wherein a slider block is movably mounted on said conveyor for movement toward and away from said pusher bar, said loading pins being resiliently mounted in said slider block.

8. The assembly machine of claim 7 wherein a boss is mounted on said conveyor, a first link pivotally mounted on said base, a second link pivotally mounted to said first link and to said slider block, said pivots on said links being arranged so that they lock overcenter against a stop when said slider block is towards said pusher bar to retain said slider block toward said pusher bar.

9. An assembly machine, said assembly machine comprising:
a securing means for securing together superimposed parts;
an endless conveyor mounted adjacent said securing machine to carry superimposed parts to said assembly machine for securement of the superimposed parts together, said conveyor conveying the lowermost superimposed part and the upper superimposed part being carried by the lowermost part;
a positioner positioned over said conveyor at said securing machine, said positioner having a stop thereon positioned to engage the upper part and retain the upper part under the securing machine until the upper part is secured to the lower part.

10. The assembly machine of claim 9 wherein a positioner arm is mounted over said conveyor and said stop is pivotally mounted on said positioner arm, resilient means to hold said stop in stop position, said resilient means permitting pivotal motion of said stop when said conveyor moves the secured upper part away from said securing machine after securement.

11. An assembly machine, said assembly machine comprising:
a securing machine, said securing machine having a movable slide thereon which moves upon securement action of said securing machine;
a conveyor mounted in association with said securing machine to convey superimposed parts to said securing machine;
a centering finger mounted on each side of said conveyor, said centering fingers being connected to said slide on said securing machine so that upon motion of said slide, said centering fingers move toward said conveyor to engage one of said parts on said conveyor to center the engaged part before securement.

12. The assembly machine of claim 11 wherein said securing machine has a base and said centering fingers are pivotally mounted with respect to said base, a cam face carried by each of said centering fingers, a cam follower mounted on said securing machine slide so that upon motion of said securing machine slide said cam faces follow said cam followers to cause said centering fingers to move toward said conveyor to center one of the parts on said conveyor.

13. The assembly machine of claim 12 wherein a spring is connected to each of said centering fingers, said springs urging said cam faces against said cam followers and urging said centering fingers toward said conveyor.

14. An assembly machine, said assembly machine comprising:
a securing machine for securing superimposed parts;
a conveyor for conveying parts to said assembly machine, said conveyor having a pusher bar thereon, said pusher bar being adapted to engage at least one of the parts to push the parts to said assembly machine;
a tension compensator mounted adjacent said conveyor, said tension compensator having a stop thereon, said stop being adapted to be engaged by parts pushed by said pusher bar, said stop being resiliently mounted and being positioned so that it engages parts on said conveyor to push the parts on said conveyor against said pusher bar while said securing machine secures the parts together to hold the parts in position during securement.

15. The assembly machine of claim 14 wherein said conveyor is mounted on a frame and said stop is mounted on a stop plate, a cam follower mounted on said stop plate and a cam mounted on said frame, said cam follower being resiliently held in engagement with said cam, said cam being positioned to move said stop away from parts pushed by said pusher bar when said conveyor moves the parts with respect to the securing machine after said securing machine secures the parts.

16. The assembly machine of claim 15 wherein said cam follower is resiliently urged against said cam by a pressed roll spring urged against said stop plate.

17. The assembly machine of claim 16 wherein a spring is mounted between said stop plate and said frame, said spring urging said stop in a direction opposite from said conveyor motion.

18. The assembly machine of claim 17 wherein a rod is secured to said stop plate, said spring being a compression spring positioned around said rod, a guide pivotally mounted on said frame, said rod extending through said guide, and a collar secured on said rod adjacent said guide to limit motion of said rod with respect to said guide and limit motion of said stop face toward said pusher rod.

19. A machine for assembling and nailing parts together, said machine comprising:

a nailing head;

a conveyor mounted with respect to said nailing head to carry parts to said nailing head so that said nailing head can nail the parts together;

control means connected to be driven by said conveyor, said control means controlling said nailing head so that said nailing head is actuated to nail when said conveyor reaches a predetermined position;

feed means for feeding parts to be nailed onto said conveyor, said feed means comprising a magazine adapted to hold a plurality of parts and ejector means for ejecting one of said parts onto said conveyor, said magazine being adapted to carry a plurality of stacked parts and said ejector mechanism being adapted to eject the bottom-most part onto said conveyor, said ejector mechanism comprising a pusher rod directed at the bottom-most part in said magazine and motor means connected to substantially axially move said pusher rod to eject the bottom-most part of said magazine;

said ejector mechanism further comprising guide means which embraces and axially guides said pusher rod, said guide means being spring mounted with respect to said magazine so that as the bottom-most part is ejected from said magazine and the remaining parts in said magazine descend, the parts in said magazine are able to vertically move said pusher rod and thereby deflect said guide means mounting spring;

said guide means comprising a guide, said pusher rod extending through said guide, and a guide plate mounted on said guide, said spring being mounted between said guide plate and said magazine;

and further including motive means comprising a fluid cylinder having a piston rod, a bellcrank pivotally mounted on said piston, said piston rod being pivotally connected to said bellcrank and said pusher rod being pivotally connected to said bellcrank.

20. A parts feeder, said parts feeder comprising:

a magazine adapted to carry a plurality of parts in stacked configuration, said magazine being oriented in upright position so that parts in said magazine are gravitationally fed toward the bottom of said magazine, and said magazine having a spaced pair of bottom stops to prevent free discharge of said parts from the bottom of said magazine;

a pusher bar guide resiliently mounted adjacent the bottom of said magazine and intermediate to said bottom stops;

a pusher bar generally horizontally disposed adjacent the bottom of said magazine and slidably supported by said pusher bar guide, said pusher bar being so positioned that its forward end is adapted to eject the bottom-most part from said magazine by sliding said bottom-most part horizontally off said pair of bottom stops;

a vertically disposed support rod having its lower end pivotally coupled to the rearward end of said pusher bar for supporting the same;

a rigid support means associated with the frame of said magazine and pivotally coupled to the upper end of said support rod, whereby a forward swinging movement of the lower end of said support bar drives said pusher bar forwardly against said bottom-most part in said magazine in order to eject the same.

21. A parts feeder as in claim 20 wherein said pusher bar guide is a cylinder within which said pusher bar is slidably received, and said pusher bar guide is resiliently mounted in such a way as to permit both vertical movement and twisting movement thereof, so that when said pusher bar pushes the bottom-most part out of said magazine the next higher part comes to rest on said bottom stops and concurrently pushes said pusher bar downwardly between said bottom stops while the pusher bar is being retracted.

22. The assembly machine of claim 1 wherein said support is a vertically disposed pendulum jack pivotally mounted on a horizontal axis which extends transverse to the direction of conveyor motion, the upper extremity of said jack engaging the under surface of the lowermost one of said second parts, said jack having the greater portion of its length extending below said horizontal axis whereby as said lowermost one of said second parts is pushed horizontally by said pusher, said jack first pivots with the movement of said lowermost part, then the lowermost part clears said jack but continues to support the next higher part, and then said jack swings by force of gravity back to its vertical position ready to support the next part before the lowermost part is completely ejected from the stack.

23. The assembly machine of claim 10 wherein said stop is adapted to engage the vertical surface of the leading edge of said upper part, and which further includes a tooth pivotally mounted upon the under side of said positioner arm and having a downwardly directed point just to the rear of said stop, said tooth engaging and preventing backward movement of said upper part.

24. The assembly machine of claim 10 wherein said positioner arm is pivotally supported above said conveyor, whereby after the upper part is secured the forward movement of the conveyor first causes said stop to pivot against the force of said resilient means, and then raises both said stop and said positioner arm by causing pivotal movement of said positioner arm, thereby permitting the secured upper part to move beneath and past said stop.

25. A positioner for automatically positioning a wooden member transported upon a moving conveyor, comprising:

an elongated positioner arm disposed above and generally parallel to the conveyor, the rearward end of said conveyor being pivotally supported upon an axis which extends transversely to the direction of conveyor movement;

a stop member pivotally supported from the forward end of said arm, said stop member having a closed position in which it extends in a generally vertically downward direction so as to engage the vertical surface of the forward edge of the wooden member to thereby retain the wooden member in the desired position;

resilient means normally holding said stop member in its closed position, said stop member being pivotable against the force of said resilient means to an open position in which the lower end of said stop member is displaced in the direction of conveyor movement;

and a tooth pivotally supported from said arm and having a downwardly directed point located to the rear of the lower end of said stop member when said stop member occupies its closed position;

whereby the wooden member is stopped in the desired position and there retained by said stop member, and said tooth engages the upper surface of said member to restrain said member against backward movement, but said member may be again propelled forward by application of an amount of force sufficient to overcome the holding action of said resilient means and pivot said stop member to its open position so as to clear the wooden member.

26. The positioner claimed in claim 25 wherein when the wooden member is in its retained position, said tooth point is directed upon the upper surface of the wooden member in a downwardly and forwardly direction, said tooth being pivotally supported about an axis located a substantial distance rearwardly of the tooth point.

References Cited

UNITED STATES PATENTS

| | | | |
|---|---|---|---|
| 2,574,163 | 11/1951 | Bamford, Sr. | 227—44X |
| 2,616,573 | 11/1952 | Grady | 221—270X |
| 2,876,450 | 3/1959 | Eddleblute | 227—152X |
| 2,884,117 | 4/1959 | Engleson et al. | 198—179 |
| 3,195,793 | 7/1965 | Hadnagy | 227—27 |
| 3,399,445 | 9/1968 | Carroll | 227—152UX |
| 3,443,513 | 5/1969 | Jureit et al. | 227—152X |

GRANVILLE Y. CUSTER, JR., Primary Examiner

U.S. Cl. X.R.

198—179; 221—270; 227—50, 100